United States Patent
Taunton et al.

(10) Patent No.: US 7,580,412 B2
(45) Date of Patent: Aug. 25, 2009

(54) SYSTEM AND METHOD FOR GENERATING HEADER ERROR CONTROL BYTE FOR ASYNCHRONOUS TRANSFER MODE CELL

(75) Inventors: Mark Taunton, Cambridge (GB); Timothy Martin Dobson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 741 days.

(21) Appl. No.: 10/946,304

(22) Filed: Sep. 22, 2004

(65) Prior Publication Data

US 2005/0068958 A1    Mar. 31, 2005

Related U.S. Application Data

(60) Provisional application No. 60/505,858, filed on Sep. 26, 2003.

(51) Int. Cl.
*H04L 12/56* (2006.01)
(52) U.S. Cl. ...................... 370/395.31; 370/476; 712/22
(58) Field of Classification Search ............. 370/395.1, 370/395.6, 219, 206, 392; 714/805, 786; 712/22; 706/52
See application file for complete search history.

(56) References Cited

U.S. PATENT DOCUMENTS

| | | | | |
|---|---|---|---|---|
| 5,369,773 | A | * | 11/1994 | Hammerstrom ............. 712/22 |
| 5,612,974 | A | | 3/1997 | Astrachan |
| 5,719,890 | A | * | 2/1998 | Thomman et al. ........... 714/805 |
| 5,809,493 | A | * | 9/1998 | Ahamed et al. ............. 706/52 |
| 5,909,427 | A | * | 6/1999 | Manning et al. ............ 370/219 |
| 5,931,965 | A | | 8/1999 | Alamouti |
| 5,954,836 | A | | 9/1999 | Wang |
| 6,061,449 | A | | 5/2000 | Candelore et al. |
| 6,081,921 | A | | 6/2000 | Simanapalli |
| 6,182,265 | B1 | | 1/2001 | Lim et al. |

(Continued)

OTHER PUBLICATIONS

Iternational Telecommunications Union, "Integrated Services Digital Network (ISDN) ISDN User Network Interfaces", ITU-T Recommendation I. 432, Mar. 1993, all pages.*

(Continued)

*Primary Examiner*—Hassan Kizou
*Assistant Examiner*—Jeffrey M Rutkowski
(74) *Attorney, Agent, or Firm*—Sterne, Kessler, Goldstein & Fox PLLC

(57) ABSTRACT

In an Asynchronous Transfer Mode cell, a method and apparatus are disclosed for producing a cell header having bytes with bits in reverse order. Address and control data bytes are received, and a value for a reverse bit Header Error Control byte is generated from the address and control data bytes. Additionally, the order of bits within each address and control data byte is reversed. The produced cell header comprises the reverse bit Header Error Control byte and the address and control data bytes with each address and control data byte having its bits in reversed order. In one embodiment, the present invention provides a processor instruction for producing the cell header having bytes with bits in reverse order. The instruction receives as input address and control data bytes. The instruction then computes a Header Error Control byte and formats the Header Error Control byte in reverse bit order for subsequent processing within the modem. Additionally, the instruction also reverses the bit-order of each byte of the cell header's address and control fields for subsequent processing within the modem.

49 Claims, 15 Drawing Sheets

U.S. PATENT DOCUMENTS

| | | | |
|---|---|---|---|
| 6,208,655 B1* | 3/2001 | Hodgins et al. | 370/397 |
| 6,314,102 B1* | 11/2001 | Czerwiec et al. | 370/395.6 |
| 6,442,729 B1 | 8/2002 | Kim et al. | |
| 6,448,910 B1 | 9/2002 | Lu | |
| 6,570,927 B1 | 5/2003 | Van Stralen et al. | |
| 6,577,678 B2 | 6/2003 | Scheuermann | |
| 6,594,262 B1* | 7/2003 | Kwon et al. | 370/395.1 |
| 6,631,488 B1 | 10/2003 | Stambaugh et al. | |
| 6,697,994 B2 | 2/2004 | Ishikawa | |
| 6,754,283 B1 | 6/2004 | Li | |
| 6,915,472 B1 | 7/2005 | Jones, IV et al. | |
| 7,039,852 B2 | 5/2006 | Dent | |
| 7,055,088 B2 | 5/2006 | Betts | |
| 7,139,305 B2 | 11/2006 | Gavnoudias et al. | |
| 7,154,895 B1* | 12/2006 | Bornemisza et al. | 370/395.1 |
| 7,199,740 B1 | 4/2007 | Ferguson et al. | |
| 7,305,567 B1 | 12/2007 | Hussain et al. | |
| 7,305,608 B2* | 12/2007 | Taunton et al. | 714/786 |
| 2001/0008001 A1 | 7/2001 | Suemura | |
| 2002/0124154 A1* | 9/2002 | Stacey et al. | 712/22 |
| 2003/0016670 A1* | 1/2003 | Seidl et al. | 370/392 |
| 2003/0091109 A1 | 5/2003 | Okunev et al. | |
| 2003/0190910 A1 | 10/2003 | Scheuermann | |
| 2003/0225949 A1 | 12/2003 | Hoang et al. | |
| 2004/0025104 A1 | 2/2004 | Amer | |
| 2005/0068957 A1* | 3/2005 | Taunton et al. | 370/395.1 |
| 2005/0068959 A1* | 3/2005 | Taunton et al. | 370/395.1 |
| 2005/0069134 A1* | 3/2005 | Taunton et al. | 380/255 |
| 2005/0084104 A1* | 4/2005 | Taunton et al. | 380/210 |
| 2005/0094551 A1* | 5/2005 | Taunton et al. | 370/206 |
| 2005/0100111 A1 | 5/2005 | Taunton et al. | |
| 2006/0050739 A1* | 3/2006 | Narad et al. | 370/476 |
| 2008/0137771 A1 | 6/2008 | Taunton et al. | |

OTHER PUBLICATIONS

Wen-Yu Tseng, Chin-Chou Chen, David S. L. Wei, Sy-Yen Kuo, "Design and Implementation of a High Speed Parallel Architecture for ATM UNI," ispan, pp. 288-294, 1996 International Symposium on Parallel Architectures, Algorithms and Networks (ISPAN '96), 1996.*

Seo et al., "Bit-level packet-switching all-optical multihop shuffle networks with deflection routing", Applied Optics, vol. 36, No. 14, May 10, 1997, pp. 3142-3146.*

*Splitterless asymetric digital subscriber line transceiver 2 (splitterless ADSL2)*, International Telecommunications Union (ITU-T Recommendation G.992.4), 24 pages, Jul. 2002.

*Asymmetric digital subscriber line (ADSL) transceivers*, International Telecommunications Union (ITU-T Recommendation G.922.1), 256 pages, Jun. 1999.

*Splitterless asymmetric digital subscriber line (ADSL) transceivers*, International Telecommunication Union (ITU-T Recommendation G.992.2), 179 pages, Jun. 1999.

*Asymmetric digital subscriber line transceiver 2 (ADSL2)*, International Telecommunication Union (ITU-T Recommendation G.992.3), 436 pages, Jan. 2005.

* cited by examiner

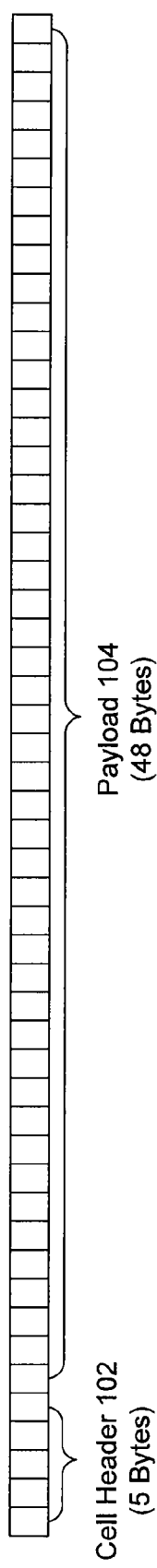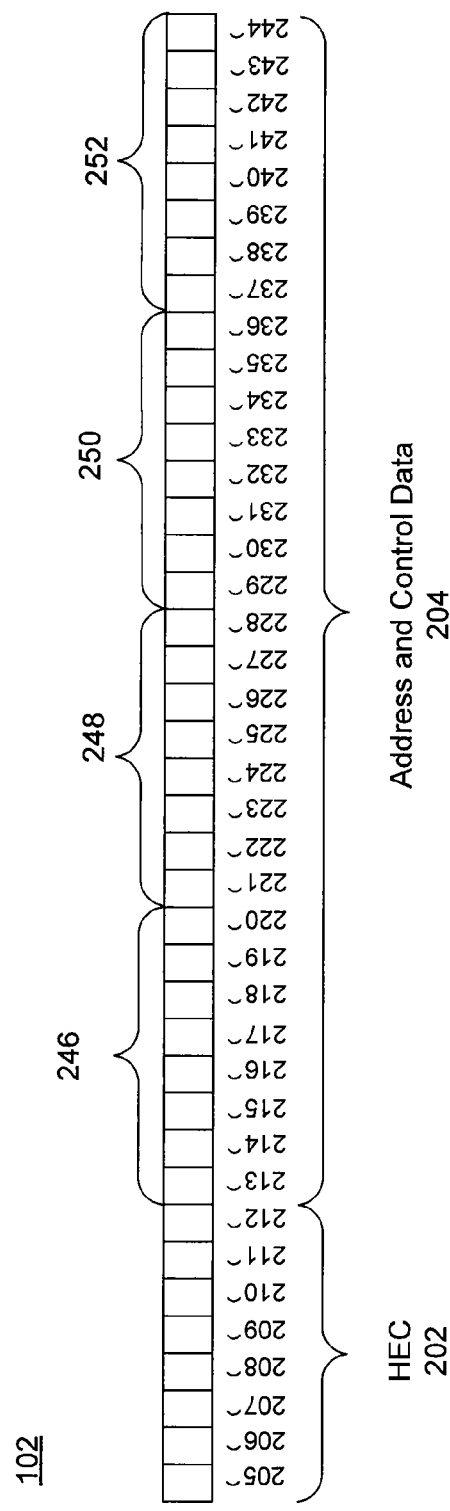

| OPCODE | DESTINATION | SOURCE 1 |
|---|---|---|

FIG. 18A

| ATMHEC | OUT | IN |
|---|---|---|

FIG. 18B

SYSTEM AND METHOD FOR GENERATING HEADER ERROR CONTROL BYTE FOR ASYNCHRONOUS TRANSFER MODE CELL

RELATED APPLICATIONS

This application claims priority from U.S. provisional application Ser. No. 60/505,858 entitled, "System and Method for Generating Header Error Control Byte for Asynchronous Transfer Mode Cell" by Mark Taunton and Timothy Dobson and filed on Sep. 26, 2003 which is incorporated by reference herein in its entirety.

FIELD OF THE INVENTION

The present invention relates generally to Asynchronous Transfer Mode (ATM) systems and to the design of instructions for processors. More specifically, the present invention relates to a system, method and processor instruction for generating a header error control byte for an ATM cell.

BACKGROUND OF THE INVENTION

Asynchronous Transfer Mode (ATM) is a common way to format and transport data in a digital telecommunication system such as, for example, an Asymmetric Digital Subscriber Line (ADSL) link. ATM communicates data in streams of cells. An ATM cell comprises a five-byte cell header and 48 bytes of payload. The cell header contains address and control data, which is used in a network to direct the transfer of the ATM cell from its source to its destination. The payload contains the data to be communicated to the destination. FIG. 1 is a block diagram of an ATM cell 100. ATM cell 100 comprises a cell header 102 and a payload 104. Cell header 102 comprises four bytes of address and control data and one byte for a Header Error Control (HEC) value.

FIG. 2 is a block diagram of cell header 102. Note that in this figure, and purely for notational convenience, the bytes of the cell header are shown in right-to-left order compared with the left-to-right order in which they are shown in FIG. 1: the earliest-processed byte of the cell header 102 is the left-most byte in FIG. 1 but the right-most (least-significant) byte 252 in FIG. 2. Cell header 102 comprises a HEC byte 202 and address and control data bytes 204. From most to least significant bit, HEC byte 202 comprises a first bit 205, a second bit 206, a third bit 207, a fourth bit 208, a fifth bit 209, a sixth bit 210, a seventh bit 211, and an eighth bit 212. HEC byte 202 is used to validate the contents of address and control data bytes 204 against possible errors in transmission. The value of HEC byte 202 is defined as a complex function of the 32 bits of address and control data bytes 204. From most to least significant bit, address and control data bytes 204 comprise a first bit 213, a second bit 214, a third bit 215, a fourth bit 216, a fifth bit 217, a sixth bit 218, a seventh bit 219, an eighth bit 220, a ninth bit 221, a tenth bit 222, an eleventh bit 223, a twelfth bit 224, a thirteenth bit 225, a fourteenth bit 226, a fifteenth bit 227, a sixteenth bit 228, a seventeenth bit 229, an eighteenth bit 230, a nineteenth bit 231, a twentieth bit 232, a twenty-first bit 233, a twenty-second bit 234, a twenty-third bit 235, a twenty-fourth bit 236, a twenty-fifth bit 237, a twenty-sixth bit 238, a twenty-seventh bit 239, a twenty-eighth bit 240, a twenty-ninth bit 241, a thirtieth bit 242, a thirty-first bit 243, and a thirty-second bit 244. From most to least significant byte, address and control data bytes 204 comprise a first byte 246, a second byte 248, a third byte 250, and a fourth byte 252.

International standards for Digital Subscriber Line (DSL) systems (such as Recommendation ITU-T G992.1 entitled "Asymmetrical digital subscriber line (ADSL) transceivers," Recommendation ITU-T G992.2 entitled "Splitterless asymmetric digital subscriber line (ADSL) transceivers," Recommendation ITU-T G992.3 entitled "Asymmetric digital subscriber line transceivers—2 (ADSL2)," and Recommendation ITU-T G992.4 entitled "Splitterless asymmetric digital subscriber line transceivers 2 (splitterless ADSL2)") define a method for conveying streams of ATM cells over a DSL link. Among other requirements, the method necessitates that when ATM cells 100 are communicated across the external data interface of a DSL modem, the bits in each byte of ATM cell 100 must be reversed in order. That is, whereas external to the DSL modem the most significant bit of each byte is processed first, within the DSL modem the least significant bit of each byte is processed first, and therefore the order of the bits within each byte must be reversed between external and internal forms so as to preserve the sequence in which the individual bits are processed, as the DSL standards require. This reversal applies to all bytes of ATM cell 100 including cell header 102.

Various standards for DSL also commonly require that when a DSL link is carrying ATM cells 100, the HEC byte 202 of each transmitted cell is generated according to the value of the address and control bytes of the cell header 102. They further commonly require that when an ATM cell 100 is received across a DSL link, its HEC byte 202 is checked for correctness in accordance to the values of the address and control bytes in the received cell header 102.

The process of generation of the HEC byte 202 for an ATM cell 100 according to the value of the address and control bytes is specified by various DSL standards to be performed in accordance with ITU-T Recommendation I.432 "B-ISDN user-network interface—Physical layer specification", and to include the operation of combining the bit sequence '01010101' into the sequence of eight HEC bits which comprise the basic HEC value, by addition modulo 2 (exclusive-or).

The process of checking validity of the HEC byte 202 for a received ATM cell 100 can be performed by generating a HEC byte value from the four bytes of address and control data within the received cell header 102, following the same process as is specified for HEC byte generation on transmission of an ATM cell 100, and comparing the generated HEC byte value for equality with the value of existing HEC byte 202 in the received cell header 102.

In an ATM-based modem in a telecommunication system, ATM cells 100 may be transmitted and received at a high rate. As identified above, it is commonly required that HEC byte 202 for each ATM cell 100 be generated by the modem upon transmission, and be checked for validity by the modem upon reception. Therefore, it is necessary to be able to generate the value of HEC byte 202 for each cell header 102 in an efficient manner. In older designs for modems, the streams of ATM cells 100 communicate though fixed-function hardware circuits that include logic circuits to compute or to check the value of HEC byte 202. However, in order to facilitate greater flexibility in modem development, it has become more common to use software to perform some modem functions. Unfortunately, computing the value of HEC byte 202 using software is a relatively complex process. Using conventional instructions (e.g., bit-wise shift, bit-wise exclusive-or, etc.), it may take many cycles to compute the value of HEC byte 202 for a single cell header 102. In a software-based multi-line modem, one processor may be required to handle several hundred thousand ATM cells 100 per second. Therefore, generation of the value of HEC byte 202 for each ATM cell 100 can represent a significant proportion of the total computational power of the modem. What is needed is a system or method that efficiently can generate the values of HEC bytes 202 for cell headers 102 for ATM cells 100.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

According to the present invention, these objects are achieved by a system and method as defined in the claims. The dependent claims define advantageous and preferred embodiments of the present invention.

The present invention relates to Asynchronous Transfer Mode (ATM) communications. In an Asynchronous Transfer Mode cell, the present invention comprises a method for producing a cell header having bytes with bits in reverse order. Address and control data bytes are received. The address and control data bytes can comprise 32 bits. Each bit can be identified according to its significance within the address and control data bytes such that a most significant bit is identified as a first bit and a least significant bit is identified as a thirty-second bit. A value for a reverse bit Header Error Control byte is generated from the address and control data bytes. An order of bits within each address and control data byte is reversed. The cell header is produced having the value for the reverse bit Header Error Control byte and the address and control data bytes with each address and control data byte having its bits in reversed order.

A value can be generated for each bit of the reverse bit Header Error Control byte. For each bit of the reverse bit Header Error Control byte: (1) a corresponding set of bits from the 32 bits is identified, (2) a classification for the corresponding set of bits is determined according to whether a number of bits from the corresponding set of bits having a value of one is an odd number or an even number, and (3) a value for the bit is set according to the classification for the corresponding set of bits.

The reverse bit Header Error Control byte can comprise eight bits. Each bit of the eight bits can be identified according its significance within the reverse bit Header Error Control byte such that a most significant bit is identified as a first Header Error Control bit and a least significant bit is identified as an eighth Header Error Control bit.

For the first Header Error Control bit, the corresponding set of bits can comprise the first bit, the second bit, the eighth bit, the tenth bit, the twelfth bit, the sixteenth bit, the seventeenth bit, the nineteenth bit, the twenty-first bit, the twenty-second bit, the twenty-fourth bit, the twenty-fifth bit, the twenty-sixth bit, and the twenty-eighth bit.

For the second Header Error Control bit, the corresponding set of bits can comprise the second bit, the seventh bit, the eighth bit, the ninth bit, the tenth bit, the eleventh bit, the twelfth bit, the fifteenth bit, the seventeenth bit, the eighteenth bit, the nineteenth bit, the twentieth bit, the twenty-second bit, the twenty-third bit, the twenty-fourth bit, the twenty-sixth bit, the twenty-seventh bit, the twenty-eighth bit, and the thirty-second bit.

For the third Header Error Control bit, the corresponding set of bits can comprise the second bit, the sixth bit, the seventh bit, the eighth bit, the ninth bit, the eleventh bit, the twelfth bit, the fourteenth bit, the sixteenth bit, the eighteenth bit, the twenty-third bit, the twenty-seventh bit, the twenty-eighth bit, the thirty-first bit, and the thirty-second bit.

For the fourth Header Error Control bit, the corresponding set of bits can comprise the first bit, the fifth bit, the sixth bit, the seventh bit, the tenth bit, the eleventh bit, the thirteenth bit, the fifteenth bit, the seventeenth bit, the twenty-second bit, the twenty-fourth bit, the twenty-sixth bit, the twenty-seventh bit, the thirtieth bit, and the thirty-first bit.

For the fifth Header Error Control bit, the corresponding set of bits can comprise the fourth bit, the fifth bit, the sixth bit, the ninth bit, the tenth bit, the twelfth bit, the fourteenth bit, the sixteenth bit, the twenty-first bit, the twenty-third bit, the twenty-fifth bit, the twenty-sixth bit, the twenty-ninth bit, the thirtieth bit, and the thirty-second bit.

For the sixth Header Error Control bit, the corresponding set of bits can comprise the third bit, the fourth bit, the fifth bit, the ninth bit, the eleventh bit, the thirteenth bit, the fifteenth bit, the twentieth bit, the twenty-second bit, the twenty-fourth bit, the twenty-fifth bit, the twenty-eighth bit, the twenty-ninth bit, and the thirty-first bit.

For the seventh Header Error Control bit, the corresponding set of bits can comprise the second bit, the third bit, the fourth bit, the tenth bit, the twelfth bit, the fourteenth bit, the nineteenth bit, the twenty-first bit, the twenty-third bit, the twenty-fourth bit, the twenty-seventh bit, the twenty-eighth bit, and the thirtieth bit.

For the eighth Header Error Control bit, the corresponding set of bits can comprise the first bit, the second bit, the third bit, the ninth bit, the eleventh bit, the thirteenth bit, the eighteenth bit, the twentieth bit, the twenty-second bit, the twenty-third bit, the twenty-sixth bit, the twenty-seventh bit, and the twenty-ninth bit.

In one embodiment, the present invention provides a method and apparatus for efficiently generating a header error control byte for an ATM cell in a modem processor by providing a processor instruction for generating a header error control byte for an ATM cell. Thus, the present invention advantageously provides a processor with the ability to generate a header error control byte with a single instruction thus allowing for a more efficient and faster way of generating the HEC byte value for each ATM cell. The computed HEC byte is formatted in reverse bit order for subsequent processing within the modem. Moreover, the present invention reverses the bit-order of the ATM cell header's address and control fields for subsequent processing within the modem. Thus, the present invention also advantageously provides great flexibility in determining the arrangement and flow of data during the generating and bit-reversing process through the use of registers and memory for storing the ATM cell header's address and control bytes and the computed HEC byte.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 1 is a block diagram of ATM cell 100.

FIG. 2 is a block diagram of cell header 102.

FIG. 18A illustrates an instruction format for a two-operand instruction supported by the processor in accordance with one embodiment of the present invention.

FIG. 18B illustrates an instruction format for generating and bit-reversing an HEC byte and for bit-reversing the header address and control bytes of an ATM cell in accordance with one embodiment of the present invention.

Figure 3:
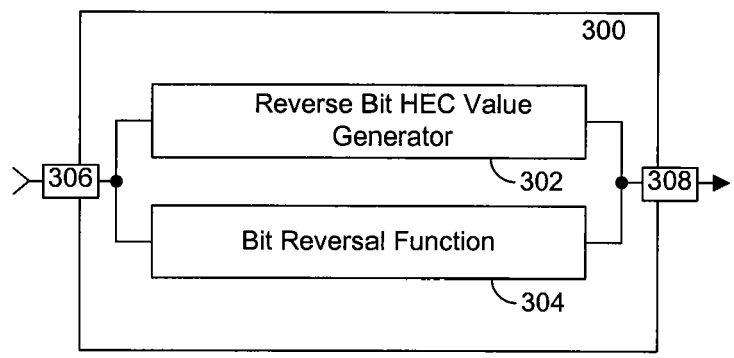
FIG. 3 is a block diagram of a system 300 of the present invention.

The preferred embodiments of the invention are described with reference to the figures where like reference numbers indicate identical or functionally similar elements. Also in the figures, the left most digit(s) of each reference number identifies the figure in which the reference number is first used.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known processes and steps have not been described in detail in order not to unnecessarily obscure the present invention.

The present invention relates to Asynchronous Transfer Mode (ATM) communications. The present invention can be used in an implementation of an ADSL Termination Unit—Central (Office) (ATU-C) in an ADSL system, also known as a CO modem. In an ADSL system, the rate of transmission and reception of data is asymmetrical. In general, more data is transmitted from the ATU-C to an ADSL Termination Unit—Remote (ATU-R) than in the other direction. Within an ATU-C, the highest rate of flow of ATM cells is usually inwards through the external data interface of the modem, for processing and modulation onto a telephone line for transmission to the other end of a DSL link. In this case the benefit of the invention is greatest in regard to the generation of the HEC byte 202 for each ATM cell 100 accepted through the external data interface for transmission across the DSL link. Nonetheless the invention may also advantageously be used in regard to the checking of the HEC byte 202 in each ATM cell received by the ATU-C across the DSL link from an ATU-R.

The present invention can also be used advantageously in an implementation of an ADSL Termination Unit—Remote (ATU-R), also known as a CPE (Customer Premise Equipment) modem. Within an ATU-R, the highest rate of flow of ATM cells is usually by reception across the DSL link, through demodulation and processing in the modem, and thence outwards through the external data interface of the modem. Thus in such usage the greatest benefit from the invention would come in the process of checking the received HEC byte 202 of each ATM cell for validity. Nonetheless the invention may also advantageously be used in the process of generation of the HEC byte 202 for each ATM cell 100 to be transmitted by the ATU-R over the DSL link to an ATU-C.

As inputs, the present invention can receive address and control data bytes 204 as a 32-bit contiguous value. The present invention assumes that the 32 bits of address and control data bytes 204 are arranged such that the bits in each byte are in the order in which they would be outside of the external data interface of the modem. The present invention directly computes the value of HEC byte 202. The present invention also reverses the order of the eight bits in each of the address and control data bytes 204. As an output, the present invention can produce a five-byte cell header 102 comprising the four address and control data bytes 204 (each of which has its bits ordered as required for use within the modem) and the HEC byte 202 (with its bits ordered as required for use within the modem). In an embodiment that uses instructions that operate on eight bytes of data at a time, cell header 102 can occupy the five least significant bytes while the bits in the three most significant bytes can all be set equal to zero.

Advantageously, the present invention can generate the value of HEC byte 202 in a single clock cycle. This represents a 20-fold or greater reduction in time as compared with conventional methods for generating the value of HEC byte 202. By reversing the order of the bits in each byte of the four address and control data bytes 204 prior to communicating cell header 102 through the external data interface of the modem, the present invention realizes an additional reduction in processing time (as would be needed to perform this function using software) or, alternatively, precludes the need for the external data interface to include additional logic circuits (as would be needed to perform this function using hardware).

Embodiments of the invention are discussed below with references to FIGS. 3 to 18. However, those skilled in the art will readily appreciate that the detailed description given herein with respect to these figures is for explanatory purposes as the invention extends beyond these limited embodiments.

FIG. 3 is a block diagram of a system 300 of the present invention. System 300 comprises a reverse bit HEC byte value generator 302 and a bit reversal function 304. Address and control data bytes 204 can be received at an input 306 and cell header 102 (with its bits ordered as required for use within the modem) can be produced at an output 308.

Figure 4:
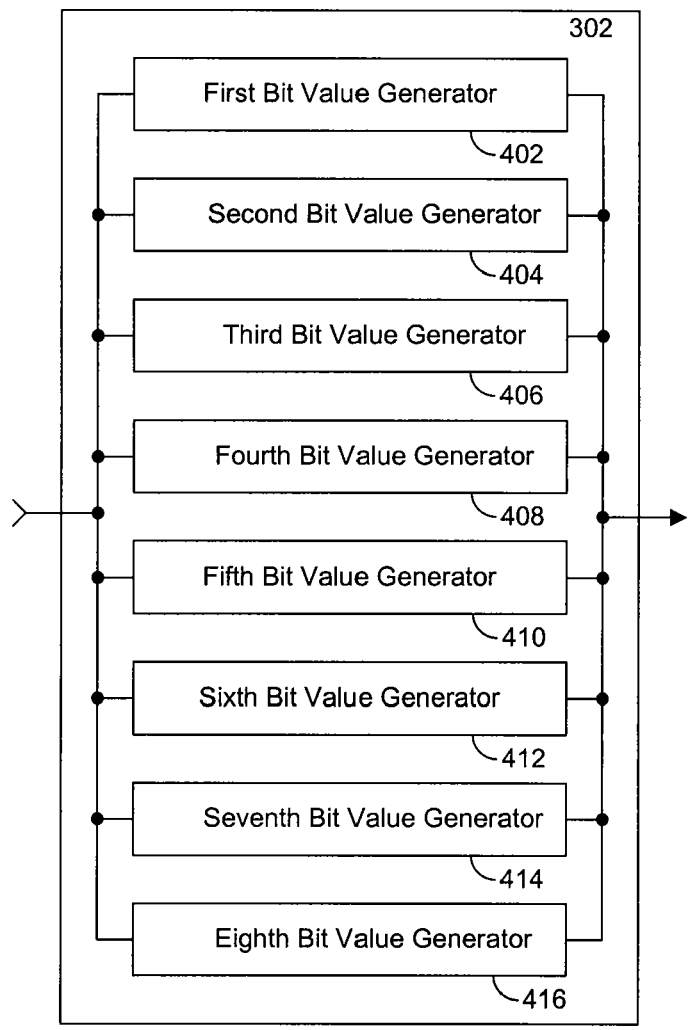
FIG. 4 is a block diagram of an embodiment of reverse bit HEC value generator 302.

FIG. 4 is a block diagram of an embodiment of reverse bit HEC byte value generator 302. Reverse bit HEC byte value generator 302 comprises a first bit value generator 402, a second bit value generator 404, a third bit value generator 406, a fourth bit value generator 408, a fifth bit value generator 410, a sixth bit value generator 412, a seventh bit value generator 414, and an eighth bit value generator 416.

Figure 5:
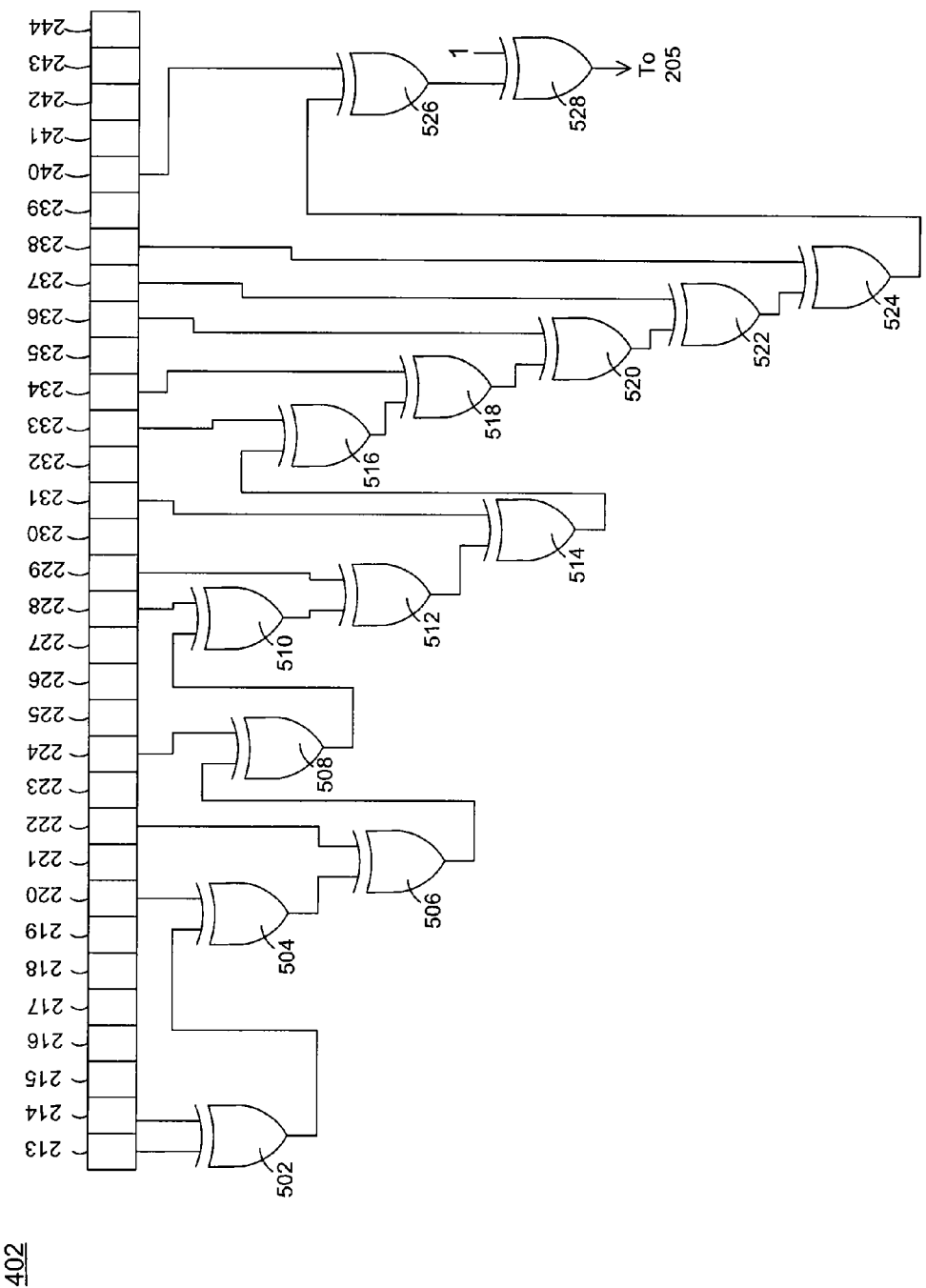
FIG. 5 is a block diagram of an embodiment of first bit value generator 402.

FIG. 5 is a block diagram of an embodiment of first bit value generator 402. First bit value generator 402 comprises a first exclusive or gate 502, a second exclusive or gate 504, a third exclusive or gate 506, a fourth exclusive or gate 508, a fifth exclusive or gate 510, a sixth exclusive or gate 512, a seventh exclusive or gate 514, an eighth exclusive or gate 516, a ninth exclusive or gate 518, a tenth exclusive or gate 520, an eleventh exclusive or gate 522, a twelfth exclusive or gate 524, a thirteenth exclusive or gate 526, and a fourteenth exclusive or gate 528.

As inputs, first exclusive or gate 502 can receive first bit 213 and second bit 214. As inputs, second exclusive or gate 504 can receive the output of first exclusive or gate 502 and eighth bit 220. As inputs, third exclusive or gate 506 can receive the output of second exclusive or gate 504 and tenth bit 222. As, inputs, fourth exclusive or gate 508 can receive the output of third exclusive or gate 506 and twelfth bit 224. As inputs, fifth exclusive or gate 510 can receive the output of fourth exclusive or gate 508 and sixteenth bit 228. As inputs, sixth exclusive or gate 512 can receive the output of fifth exclusive or gate 510 and seventeenth bit 229. As inputs, seventh exclusive or gate 514 can receive the output of sixth exclusive or gate 512 and nineteenth bit 231. As inputs, eighth exclusive or gate 516 can receive the output of seventh exclusive or gate 514 and twenty-first bit 233. As inputs, ninth exclusive or gate 518 can receive the output of eighth exclusive or gate 516 and twenty-second bit 234. As inputs, tenth exclusive or gate 520 can receive the output of ninth exclusive or gate 518 and twenty-fourth bit 236. As inputs, eleventh exclusive or gate 522 can receive the output of tenth exclusive or gate 520 and twenty-fifth bit 237. As inputs, twelfth exclusive or gate 524 can receive the output of eleventh exclusive or gate 522 and twenty-sixth bit 238. As inputs, thirteenth exclusive or gate 526 can receive the output of twelfth exclusive or gate 524 and twenty-eighth bit 240. As input, fourteenth exclusive or gate 528 can receive the output of thirteenth exclusive or gate 526 and the value one. First bit 205 of HEC byte 202 can receive the output of fourteenth exclusive or gate 528.

The skilled artisan will appreciate that first bit value generator 402 can be realized using other circuit configurations. For example, the output from fourteenth exclusive or gate 528 may alternatively be produced by a logical inverter gate which takes the output of thirteenth exclusive or gate 526 as its sole input, since the logical exclusive-or combination of any input value with the value one (logical 'true') yields the logical inverse of the input value; exclusive or gate 528 would in that case be omitted. Also, by combining the various bits of input to first bit value generator 402 in a different order (for example, by first generating the exclusive-or combinations of separate pairs of input bits, then combining the outputs of that stage pair-wise into a second set of exclusive or gates, etc.), the number of gates through which a logic signal derived from any one input bit must pass, in order to produce the final bit value output (the "depth" of the logic), may be reduced. In some cases this may be advantageous, for example to reduce the time taken by the logic to generate first bit value 205. Therefore, the present invention is not limited to the embodiment of first bit value generator 402 shown at FIG. 5.

Figure 6:
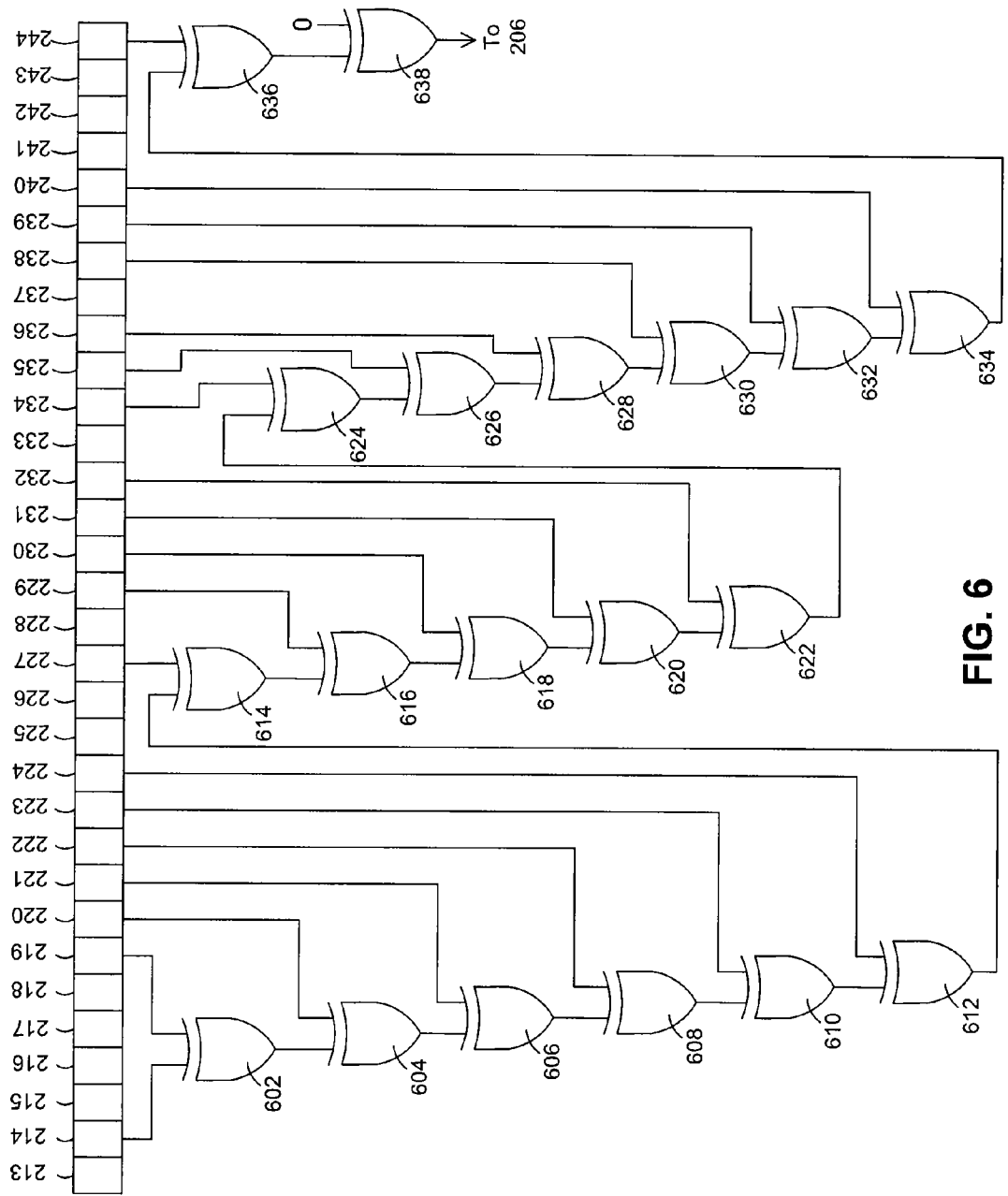
FIG. 6 is a block diagram of an embodiment of second bit value generator 404.

FIG. 6 is a block diagram of an embodiment of second bit value generator 404. Second bit value generator 404 comprises a first exclusive or gate 602, a second exclusive or gate 604, a third exclusive or gate 606, a fourth exclusive or gate 608, a fifth exclusive or gate 610, a sixth exclusive or gate 612, a seventh exclusive or gate 614, an eighth exclusive or gate 616, a ninth exclusive or gate 618, a tenth exclusive or gate 620, an eleventh exclusive or gate 622, a twelfth exclusive or gate 624, a thirteenth exclusive or gate 626, a fourteenth exclusive or gate 628, a fifteenth exclusive or gate 630, a sixteenth exclusive or gate 632, a seventeenth exclusive or gate 634, an eighteenth exclusive or gate 636, and a nineteenth exclusive or gate 638.

As inputs, first exclusive or gate 602 can receive second bit 214 and seventh bit 219. As inputs, second exclusive or gate 604 can receive the output of first exclusive or gate 602 and eighth bit 220. As inputs, third exclusive or gate 606 can receive the output of second exclusive or gate 604 and ninth bit 221. As, inputs, fourth exclusive or gate 608 can receive the output of third exclusive or gate 606 and tenth bit 222. As inputs, fifth exclusive or gate 610 can receive the output of fourth exclusive or gate 608 and eleventh bit 223. As inputs, sixth exclusive or gate 612 can receive the output of fifth exclusive or gate 610 and twelfth bit 224. As inputs, seventh exclusive or gate 614 can receive the output of sixth exclusive or gate 612 and fifteenth bit 227. As inputs, eighth exclusive or gate 616 can receive the output of seventh exclusive or gate 614 and seventeenth bit 229. As inputs, ninth exclusive or gate 618 can receive the output of eighth exclusive or gate 616 and eighteenth bit 230. As inputs, tenth exclusive or gate 620 can receive the output of ninth exclusive or gate 618 and nineteenth bit 231. As inputs, eleventh exclusive or gate 622 can receive the output of tenth exclusive or gate 620 and twentieth bit 232. As inputs, twelfth exclusive or gate 624 can receive the output of eleventh exclusive or gate 622 and twenty-second bit 234. As inputs, thirteenth exclusive or gate 626 can receive the output of twelfth exclusive or gate 624 and twenty-third bit 235. As input, fourteenth exclusive or gate 628 can receive the output of thirteenth exclusive or gate 626 and twenty-fourth bit 236. As inputs, fifteenth exclusive or gate 630 can receive the output of fourteenth exclusive or gate 628 and twenty-sixth bit 238. As inputs, sixteenth exclusive or gate 632 can receive the output of fifteenth exclusive or gate 630 and twenty-seventh bit 239. As inputs, seventeenth exclusive or gate 634 can receive the output of sixteenth exclusive or gate 632 and twenty-eighth bit 240. As inputs, the eighteenth exclusive or gate 636 can receive the output of seventeenth exclusive or gate 634 and thirty-second bit 244. As inputs, the nineteenth exclusive or gate 638 can receive the output of eighteenth exclusive or gate 636 and the value zero. Second bit 206 of HEC byte 202 can receive the output of nineteenth exclusive or gate 638.

The skilled artisan will appreciate that second bit value generator 404 can be realized using other circuit configurations. For example, nineteenth exclusive or gate 638 can be removed, such that the output of second bit value generator 404 can simply be the output of eighteenth exclusive or gate 636, since the logical exclusive-or combination of any input value x with the value zero (logical 'false') yields as output the same value as the input value x. Other changes might also be made in the ordering of the combination of input values, as described above for first bit value generator 402. Therefore, the present invention is not limited to the embodiment of second bit value generator 404 shown at FIG. 6.

Figure 7:
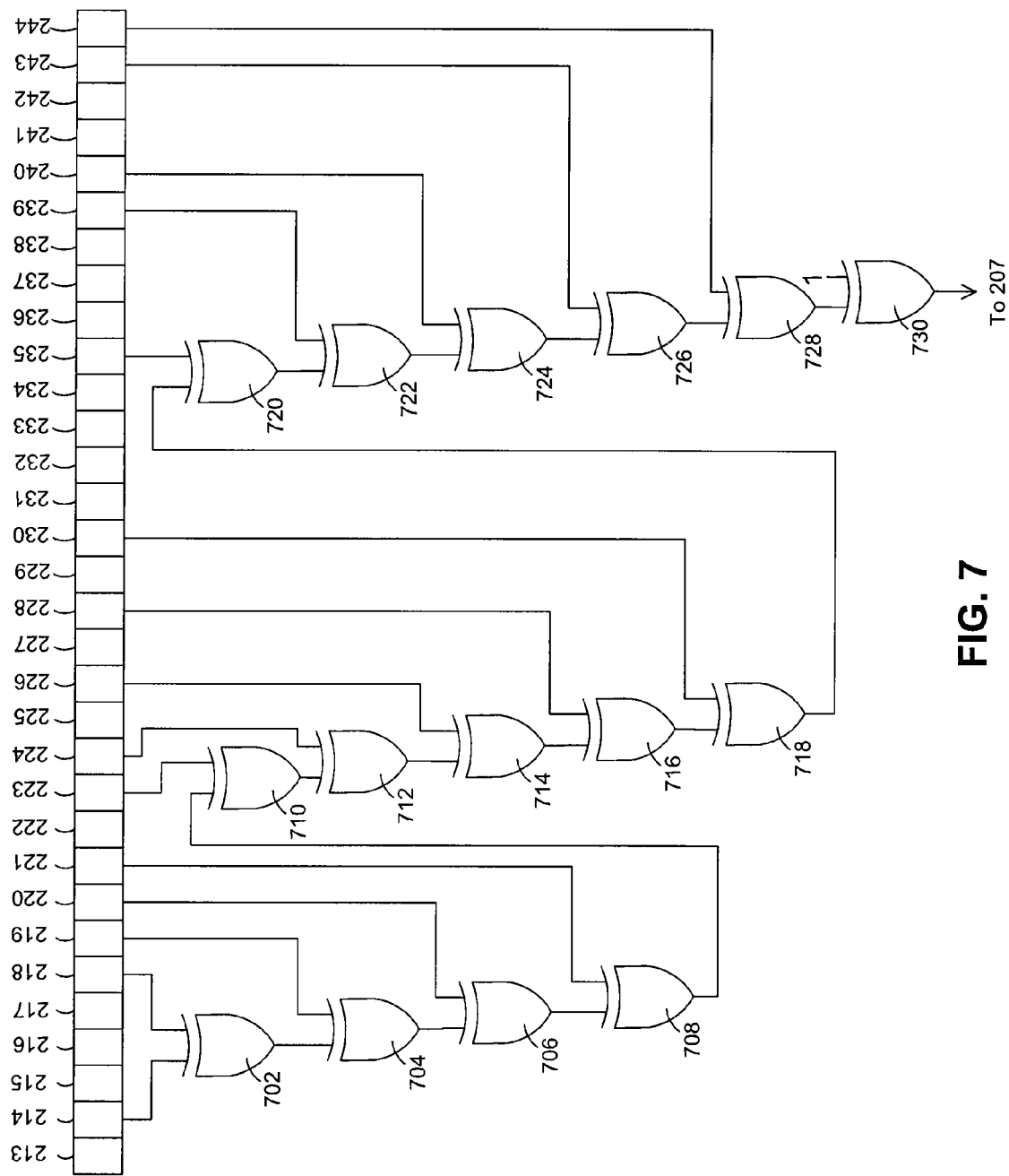
FIG. 7 is a block diagram of an embodiment of third bit value generator 406.

FIG. 7 is a block diagram of an embodiment of third bit value generator 406. Third bit value generator 406 comprises a first exclusive or gate 702, a second exclusive or gate 704, a third exclusive or gate 706, a fourth exclusive or gate 708, a fifth exclusive or gate 710, a sixth exclusive or gate 712, a seventh exclusive or gate 714, an eighth exclusive or gate 716, a ninth exclusive or gate 718, a tenth exclusive or gate 720, an eleventh exclusive or gate 722, a twelfth exclusive or gate 724, a thirteenth exclusive or gate 726, a fourteenth exclusive or gate 728, and a fifteenth exclusive or gate 730.

As inputs, first exclusive or gate 702 can receive second bit 214 and sixth bit 218. As inputs, second exclusive or gate 704 can receive the output of first exclusive or gate 702 and seventh bit 219. As inputs, third exclusive or gate 706 can receive the output of second exclusive or gate 704 and eighth bit 220. As, inputs, fourth exclusive or gate 708 can receive the output of third exclusive or gate 706 and ninth bit 221. As inputs, fifth exclusive or gate 710 can receive the output of fourth exclusive or gate 708 and eleventh bit 223. As inputs, sixth exclusive or gate 712 can receive the output of fifth exclusive or gate 710 and twelfth bit 224. As inputs, seventh exclusive or gate 714 can receive the output of sixth exclusive or gate 712 and fourteenth bit 226. As inputs, eighth exclusive or gate 716 can receive the output of seventh exclusive or gate 714 and sixteenth bit 228. As inputs, ninth exclusive or gate 718 can receive the output of eighth exclusive or gate 716 and eighteenth bit 230. As inputs, tenth exclusive or gate 720 can receive the output of ninth exclusive or gate 718 and twenty-third bit 235. As inputs, eleventh exclusive or gate 722 can receive the output of tenth exclusive or gate 720 and twenty-seventh bit 239. As inputs, twelfth exclusive or gate 724 can receive the output of eleventh exclusive or gate 722 and twenty-eighth bit 240. As inputs, thirteenth exclusive or gate 726 can receive the output of twelfth exclusive or gate 724 and thirty-first bit 243. As input, fourteenth exclusive or gate 728 can receive the output of thirteenth exclusive or gate 726 and thirty-second bit 244. As inputs, fifteenth exclusive or gate 730 can receive the output of fourteenth exclusive or gate 728 and the value one. Third bit 207 of HEC byte 202 can receive the output of fifteenth exclusive or gate 730.

The skilled artisan will appreciate that third bit value generator 406 can be realized using other circuit configurations, in a similar way to that described above for first bit value generator 402. Therefore, the present invention is not limited to the embodiment of third bit value generator 406 shown at FIG. 7.

Figure 8:
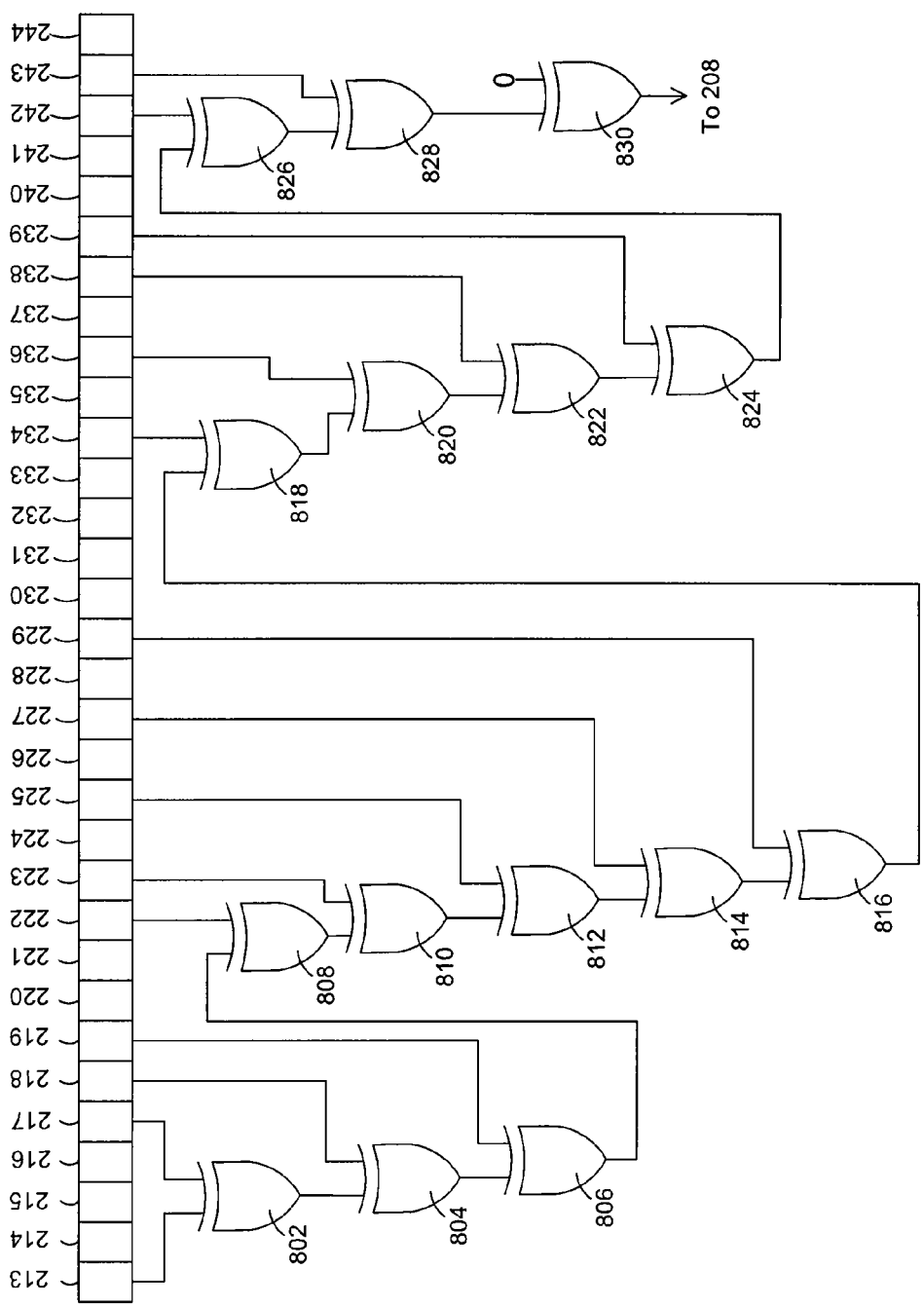
FIG. 8 is a block diagram of an embodiment of fourth bit value generator 408.

FIG. 8 is a block diagram of an embodiment of fourth bit value generator 408. Fourth bit value generator 408 comprises a first exclusive or gate 802, a second exclusive or gate 804, a third exclusive or gate 806, a fourth exclusive or gate 808, a fifth exclusive or gate 810, a sixth exclusive or gate 812, a seventh exclusive or gate 814, an eighth exclusive or gate 816, a ninth exclusive or gate 818, a tenth exclusive or gate 820, an eleventh exclusive or gate 822, a twelfth exclusive or gate 824, a thirteenth exclusive or gate 826, a fourteenth exclusive or gate 828, and a fifteenth exclusive or gate 830.

As inputs, first exclusive or gate 802 can receive first bit 213 and fifth bit 217. As inputs, second exclusive or gate 804 can receive the output of first exclusive or gate 802 and sixth bit 218. As inputs, third exclusive or gate 806 can receive the output of second exclusive or gate 804 and seventh bit 219. As, inputs, fourth exclusive or gate 808 can receive the output of third exclusive or gate 806 and tenth bit 222. As inputs, fifth exclusive or gate 810 can receive the output of fourth exclusive or gate 808 and eleventh bit 223. As inputs, sixth exclusive or gate 812 can receive the output of fifth exclusive or gate 810 and thirteenth bit 225. As inputs, seventh exclusive or gate 814 can receive the output of sixth exclusive or gate 812 and fifteenth bit 227. As inputs, eighth exclusive or gate 816 can receive the output of seventh exclusive or gate 814 and seventeenth bit 229. As inputs, ninth exclusive or gate 818 can receive the output of eighth exclusive or gate 816 and twenty-second bit 234. As inputs, tenth exclusive or gate 820 can receive the output of ninth exclusive or gate 818 and twenty-fourth bit 236. As inputs, eleventh exclusive or gate 822 can receive the output of tenth exclusive or gate 820 and twenty-sixth bit 238. As inputs, twelfth exclusive or gate 824 can receive the output of eleventh exclusive or gate 822 and twenty-seventh bit 239. As inputs, thirteenth exclusive or gate 826 can receive the output of twelfth exclusive or gate 824 and thirtieth bit 242. As input, fourteenth exclusive or gate 828 can receive the output of thirteenth exclusive or gate 826 and thirty-first bit 243. As inputs, fifteenth exclusive or gate 830 can receive the output of fourteenth exclusive or gate 828 and the value zero. Fourth bit 208 of HEC byte 202 can receive the output of fifteenth exclusive or gate 830.

The skilled artisan will appreciate that fourth bit value generator 408 can be realized using other circuit configurations, in a similar way to that described above for second bit value generator 404. Therefore, the present invention is not limited to the embodiment of fourth bit value generator 408 shown at FIG. 8.

Figure 9:
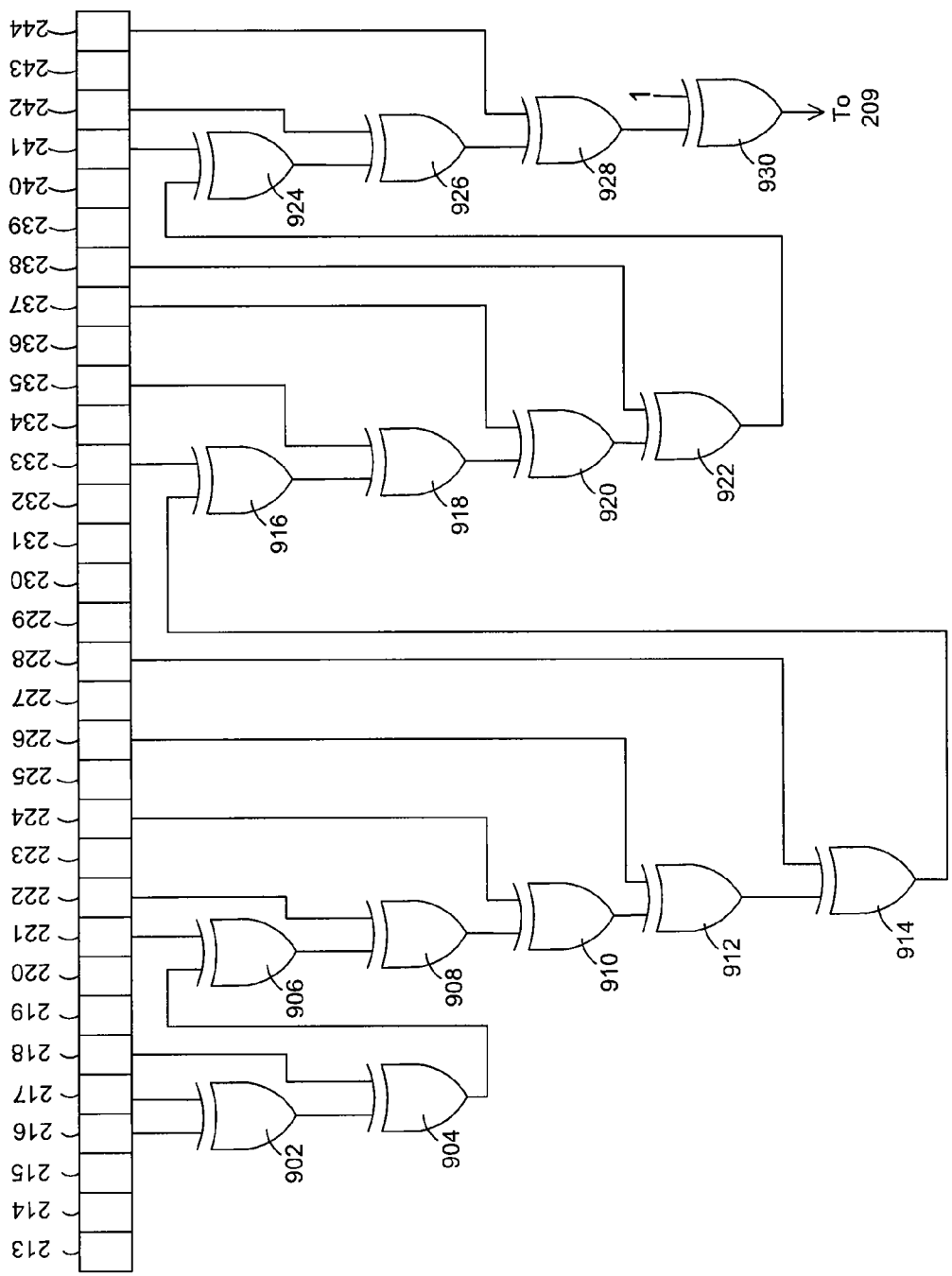
FIG. 9 is a block diagram of an embodiment of fifth bit value generator 410.

FIG. 9 is a block diagram of an embodiment of fifth bit value generator 410. Fifth bit value generator 410 comprises a first exclusive or gate 902, a second exclusive or gate 904, a third exclusive or gate 906, a fourth exclusive or gate 908, a fifth exclusive or gate 910, a sixth exclusive or gate 912, a seventh exclusive or gate 914, an eighth exclusive or gate 916, a ninth exclusive or gate 918, a tenth exclusive or gate 920, an eleventh exclusive or gate 922, a twelfth exclusive or gate 924, a thirteenth exclusive or gate 926, a fourteenth exclusive or gate 928, and a fifteenth exclusive or gate 930.

As inputs, first exclusive or gate 902 can receive fourth bit 216 and fifth bit 217. As inputs, second exclusive or gate 904 can receive the output of first exclusive or gate 902 and sixth bit 218. As inputs, third exclusive or gate 906 can receive the output of second exclusive or gate 904 and ninth bit 221. As, inputs, fourth exclusive or gate 908 can receive the output of third exclusive or gate 906 and tenth bit 222. As inputs, fifth exclusive or gate 910 can receive the output of fourth exclusive or gate 908 and twelfth bit 224. As inputs, sixth exclusive or gate 912 can receive the output of fifth exclusive or gate 910 and fourteenth bit 226. As inputs, seventh exclusive or gate 914 can receive the output of sixth exclusive or gate 912 and sixteenth bit 228. As inputs, eighth exclusive or gate 916 can receive the output of seventh exclusive or gate 914 and twenty-first bit 233. As inputs, ninth exclusive or gate 918 can receive the output of eighth exclusive or gate 916 and twenty-third bit 235. As inputs, tenth exclusive or gate 920 can receive the output of ninth exclusive or gate 918 and twenty-fifth bit 237. As inputs, eleventh exclusive or gate 922 can receive the output of tenth exclusive or gate 920 and twenty-sixth bit 238. As inputs, twelfth exclusive or gate 924 can receive the output of eleventh exclusive or gate 922 and twenty-ninth bit 241. As inputs, thirteenth exclusive or gate 926 can receive the output of twelfth exclusive or gate 924 and thirtieth bit 242. As input, fourteenth exclusive or gate 928 can receive the output of thirteenth exclusive or gate 926 and thirty-second bit 244. As inputs, fifteenth exclusive or gate 930 can receive the output of fourteenth exclusive or gate 928 and the value one. Fifth bit 209 of HEC byte 202 can receive the output of fifteenth exclusive or gate 930.

The skilled artisan will appreciate that fifth bit value generator 410 can be realized using other circuit configurations, in a similar way to that described above for first bit value generator 402. Therefore, the present invention is not limited to the embodiment of fifth bit value generator 410 shown at FIG. 9.

Figure 10:
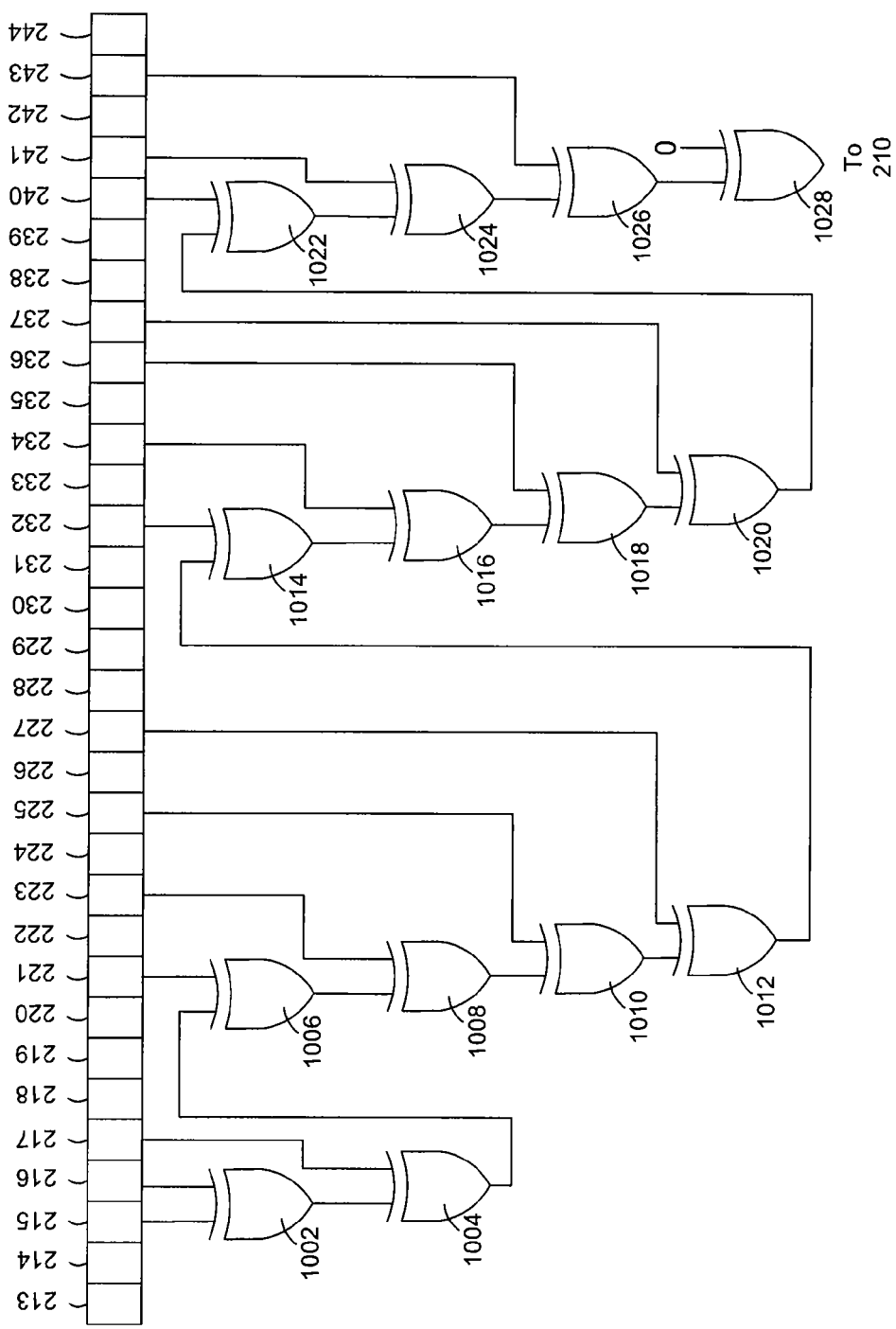
FIG. 10 is a block diagram of an embodiment of sixth bit value generator 412.

FIG. 10 is a block diagram of an embodiment of sixth bit value generator 412. Sixth bit value generator 412 comprises a first exclusive or gate 1002, a second exclusive or gate 1004, a third exclusive or gate 1006, a fourth exclusive or gate 1008, a fifth exclusive or gate 1010, a sixth exclusive or gate 1012, a seventh exclusive or gate 1014, an eighth exclusive or gate 1016, a ninth exclusive or gate 1018, a tenth exclusive or gate 1020, an eleventh exclusive or gate 1022, a twelfth exclusive or gate 1024, a thirteenth exclusive or gate 1026, and a fourteenth exclusive or gate 1028.

As inputs, first exclusive or gate 1002 can receive third bit 215 and fourth bit 216. As inputs, second exclusive or gate 1004 can receive the output of first exclusive or gate 1002 and fifth bit 217. As inputs, third exclusive or gate 1006 can receive the output of second exclusive or gate 1004 and ninth bit 221. As, inputs, fourth exclusive or gate 1008 can receive the output of third exclusive or gate 1006 and eleventh bit 223. As inputs, fifth exclusive or gate 1010 can receive the output of fourth exclusive or gate 1008 and thirteenth bit 225. As inputs, sixth exclusive or gate 1012 can receive the output of fifth exclusive or gate 1010 and fifteenth bit 227. As inputs, seventh exclusive or gate 1014 can receive the output of sixth exclusive or gate 1012 and twentieth bit 232. As inputs, eighth exclusive or gate 1016 can receive the output of seventh exclusive or gate 1014 and twenty-second bit 234. As inputs, ninth exclusive or gate 1018 can receive the output of eighth exclusive or gate 1016 and twenty-fourth bit 236. As inputs, tenth exclusive or gate 1020 can receive the output of ninth exclusive or gate 1018 and twenty-fifth bit 237. As inputs, eleventh exclusive or gate 1022 can receive the output of tenth exclusive or gate 1020 and twenty-eighth bit 240. As inputs, twelfth exclusive or gate 1024 can receive the output of eleventh exclusive or gate 1022 and twenty-ninth bit 241. As inputs, thirteenth exclusive or gate 1026 can receive the output of twelfth exclusive or gate 1024 and thirty-first bit 243. As input, fourteenth exclusive or gate 1028 can receive the output of thirteenth exclusive or gate 1026 and the value zero. Sixth bit 210 of HEC byte 202 can receive the output of fourteenth exclusive or gate 1028.

The skilled artisan will appreciate that sixth bit generator 412 can be realized using other circuit configurations, in a similar way to that described above for second bit value generator 404. Therefore, the present invention is not limited to the embodiment of sixth bit value generator 412 shown at FIG. 10.

Figure 11:
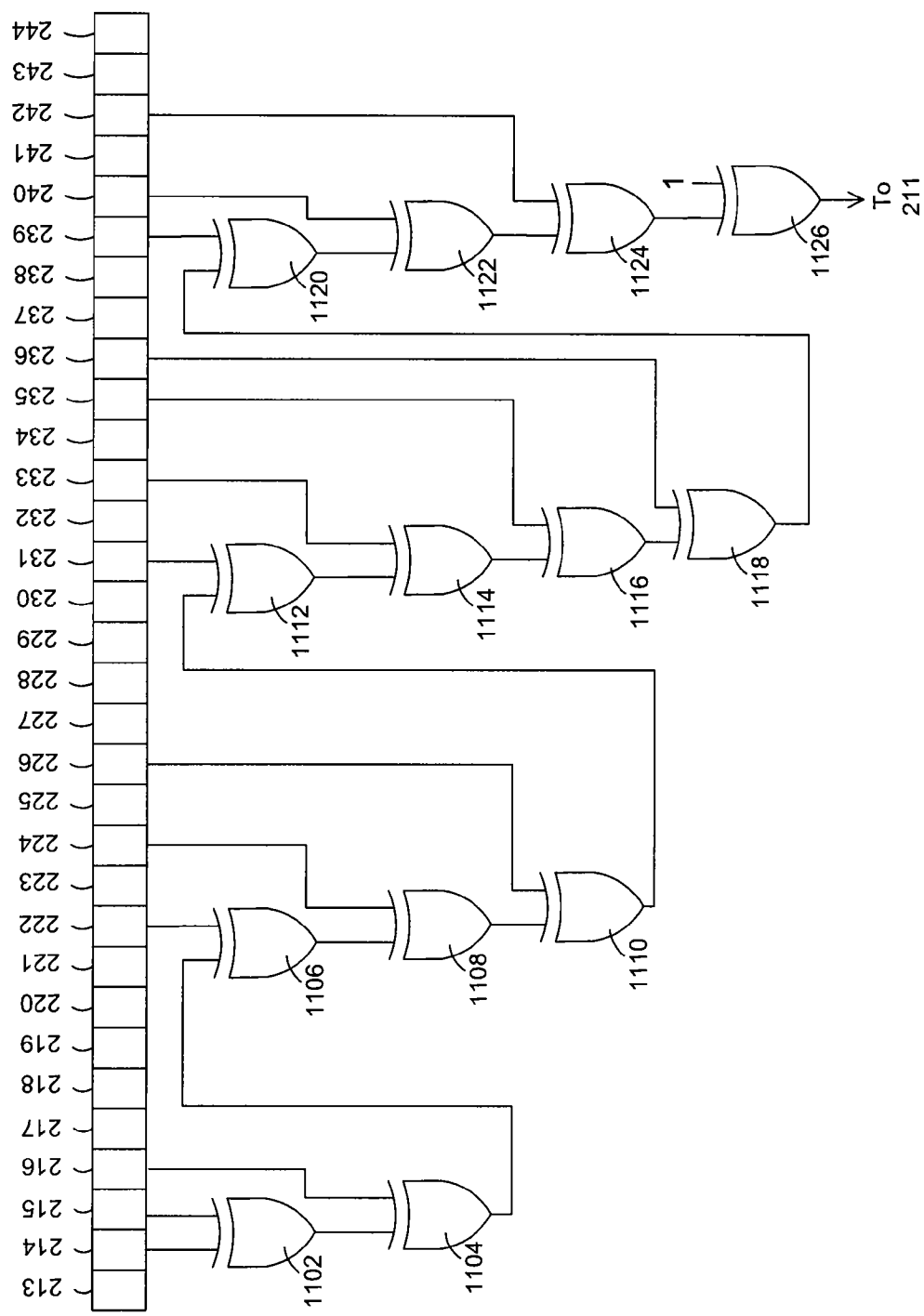
FIG. 11 is a block diagram of an embodiment of seventh bit value generator 414.

FIG. 11 is a block diagram of an embodiment of seventh bit value generator 414. Seventh bit value generator 414 comprises a first exclusive or gate 1102, a second exclusive or gate 1104, a third exclusive or gate 1106, a fourth exclusive or gate 1108, a fifth exclusive or gate 1110, a sixth exclusive or gate 1112, a seventh exclusive or gate 1114, an eighth exclusive or gate 1116, a ninth exclusive or gate 1118, a tenth exclusive or gate 1120, an eleventh exclusive or gate 1122, a twelfth exclusive or gate 1124, and a thirteenth exclusive or gate 1126.

As inputs, first exclusive or gate 1102 can receive second bit 214 and third bit 215. As inputs, second exclusive or gate 1104 can receive the output of first exclusive or gate 1102 and fourth bit 216. As inputs, third exclusive or gate 1106 can receive the output of second exclusive or gate 1104 and tenth bit 222. As, inputs, fourth exclusive or gate 1108 can receive the output of third exclusive or gate 1106 and twelfth bit 224. As inputs, fifth exclusive or gate 1110 can receive the output of fourth exclusive or gate 1108 and fourteenth bit 226. As inputs, sixth exclusive or gate 1112 can receive the output of fifth exclusive or gate 1110 and nineteenth bit 231. As inputs, seventh exclusive or gate 1114 can receive the output of sixth exclusive or gate 1112 and twenty-first bit 233. As inputs, eighth exclusive or gate 1116 can receive the output of seventh exclusive or gate 1114 and twenty-third bit 235. As inputs, ninth exclusive or gate 1118 can receive the output of eighth exclusive or gate 1116 and twenty-fourth bit 236. As inputs, tenth exclusive or gate 1120 can receive the output of ninth exclusive or gate 1118 and twenty-seventh bit 239. As inputs, eleventh exclusive or gate 1122 can receive the output of tenth exclusive or gate 1120 and twenty-eighth bit 240. As inputs, twelfth exclusive or gate 1124 can receive the output of eleventh exclusive or gate 1122 and thirtieth bit 242. As inputs, thirteenth exclusive or gate 1126 can receive the output of twelfth exclusive or gate 1124 and the value one. Seventh bit 211 of HEC byte 202 can receive the output of thirteenth exclusive or gate 1126.

The skilled artisan will appreciate that seventh bit value generator 414 can be realized using other circuit configurations, in a similar way to that described above for first bit value generator 402. Therefore, the present invention is not limited to the embodiment of seventh bit value generator 414 shown at FIG. 11.

Figure 12:
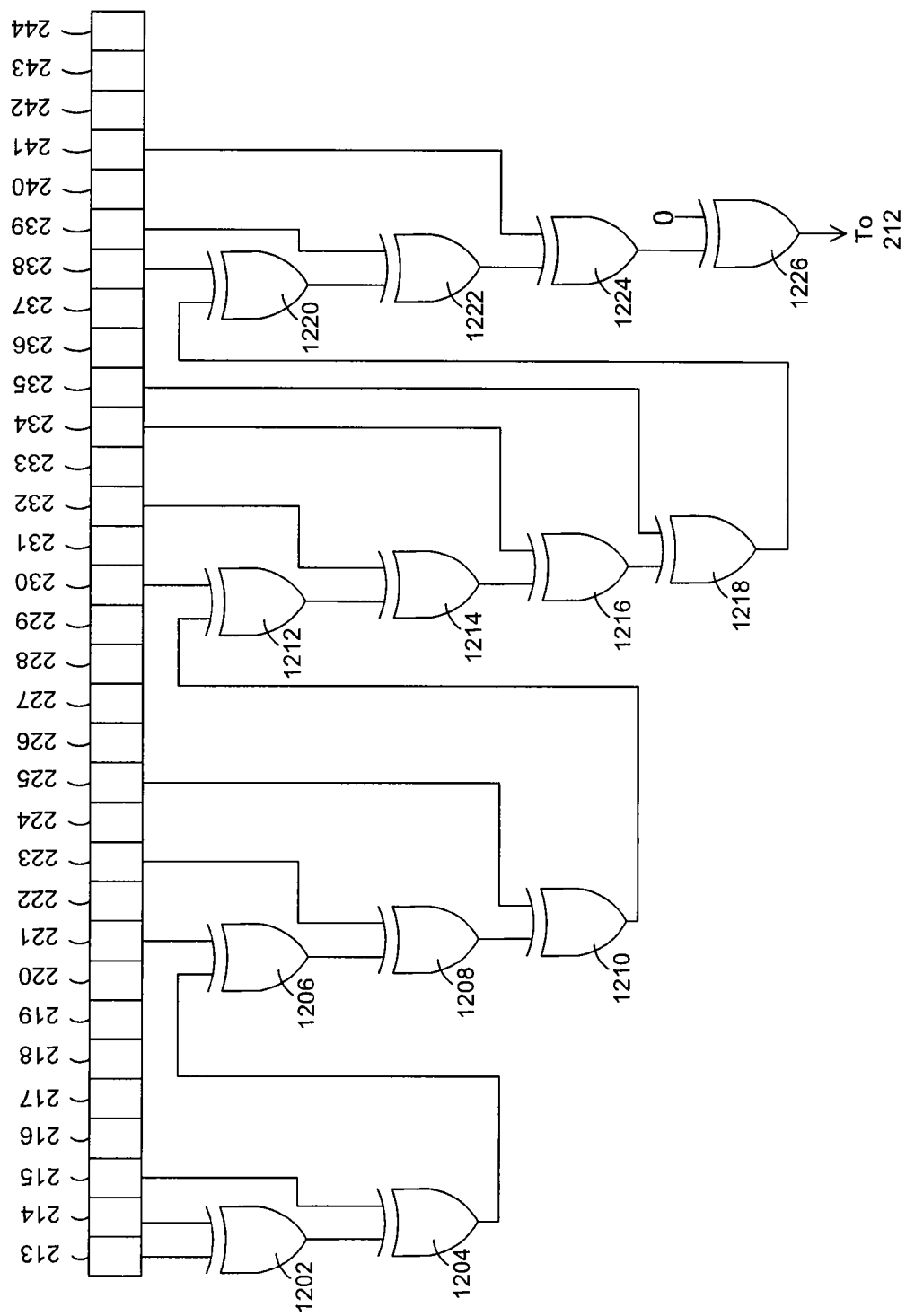
FIG. 12 is a block diagram of an embodiment of eighth bit value generator 416.

FIG. 12 is a block diagram of an embodiment of eighth bit value generator 416. Eighth bit value generator 416 comprises a first exclusive or gate 1202, a second exclusive or gate 1204, a third exclusive or gate 1206, a fourth exclusive or gate 1208, a fifth exclusive or gate 1210, a sixth exclusive or gate 1212, a seventh exclusive or gate 1214, an eighth exclusive or gate 1216, a ninth exclusive or gate 1218, a tenth exclusive or gate 1220, an eleventh exclusive or gate 1222, a twelfth exclusive or gate 1224, and a thirteenth exclusive or gate 1226.

As inputs, first exclusive or gate 1202 can receive first bit 213 and second bit 214. As inputs, second exclusive or gate 1204 can receive the output of first exclusive or gate 1202 and third bit 215. As inputs, third exclusive or gate 1206 can receive the output of second exclusive or gate 1204 and ninth bit 221. As, inputs, fourth exclusive or gate 1208 can receive the output of third exclusive or gate 1206 and eleventh bit 223. As inputs, fifth exclusive or gate 1210 can receive the output of fourth exclusive or gate 1208 and thirteenth bit 225. As inputs, sixth exclusive or gate 1212 can receive the output of fifth exclusive or gate 1210 and eighteenth bit 230. As inputs, seventh exclusive or gate 1214 can receive the output of sixth exclusive or gate 1212 and twentieth bit 232. As inputs, eighth exclusive or gate 1216 can receive the output of seventh exclusive or gate 1214 and twenty-second bit 234. As inputs, ninth exclusive or gate 1218 can receive the output of eighth exclusive or gate 1216 and twenty-third bit 235. As inputs, tenth exclusive or gate 1220 can receive the output of ninth exclusive or gate 1218 and twenty-sixth bit 238. As inputs, eleventh exclusive or gate 1222 can receive the output of tenth exclusive or gate 1220 and twenty-seventh bit 239. As inputs, twelfth exclusive or gate 1224 can receive the output of eleventh exclusive or gate 1222 and twenty-ninth bit 241. As inputs, thirteenth exclusive or gate 1226 can receive the output of twelfth exclusive or gate 1224 and the value zero. Eighth bit 212 of HEC byte 202 can receive the output of thirteenth exclusive or gate 1226.

The skilled artisan will appreciate that eighth bit value generator 416 can be realized using other circuit configurations, in a similar way to that described above for second bit value generator 404. Therefore, the present invention is not limited to the embodiment of eighth bit value generator 416 shown at FIG. 12.

The skilled artisan will also appreciate with reference to FIG. 4 through FIG. 12 that the eight individual bit value generators 402, 404, 406, 408, 410, 412, 414 and 416 may be further integrated together in an alternate embodiment of reverse bit HEC value generator 302. This would allow some repeated combinations of subsets of the thirty two input bits 213 through 244, constructed separately in individual bit value generators as described above, to be constructed only once and shared between different generated output bit values. It could also allow the order of combination of input bits to be optimized for best performance in respect of physical layout and signal timing in relation to integrated circuit design requirements. In a preferred embodiment, the logic circuitry for implementing the present invention may be generated using a logic-optimizing software program (such as 'BuildGates' by Cadence Design Systems, Inc.), which is given as input a top-level description of the logic function, i.e. comparable to the equations listed below with reference to a detailed description of the ATMHEC instruction. Therefore, the present invention is not limited to the embodiment of the reverse bit HEC value generator as eight individual bit value generators shown at FIG. 4 and FIGS. 5-12.

Figure 13:
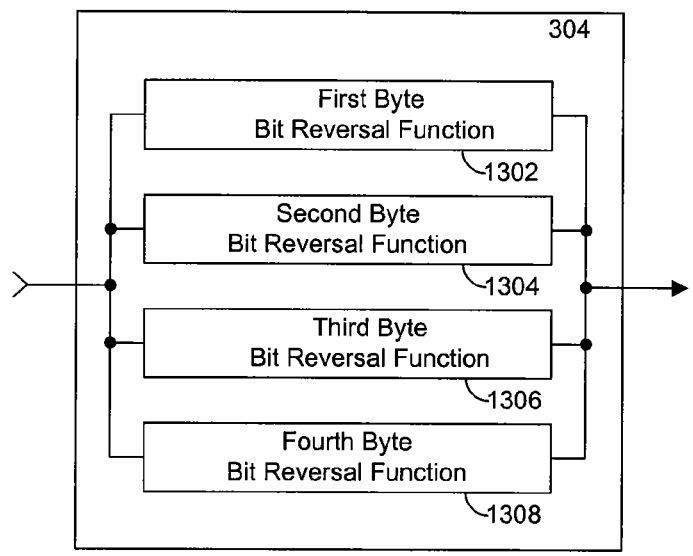
FIG. 13 is a block diagram of an embodiment of bit reversal function 304.

FIG. 13 is a block diagram of an embodiment of bit reversal function 304. Bit reversal function 304 comprises a first byte bit reversal function 1302, a second byte bit reversal function 1304, a third byte bit reversal function 1306, and a fourth byte bit reversal function 1308.

Figure 14:
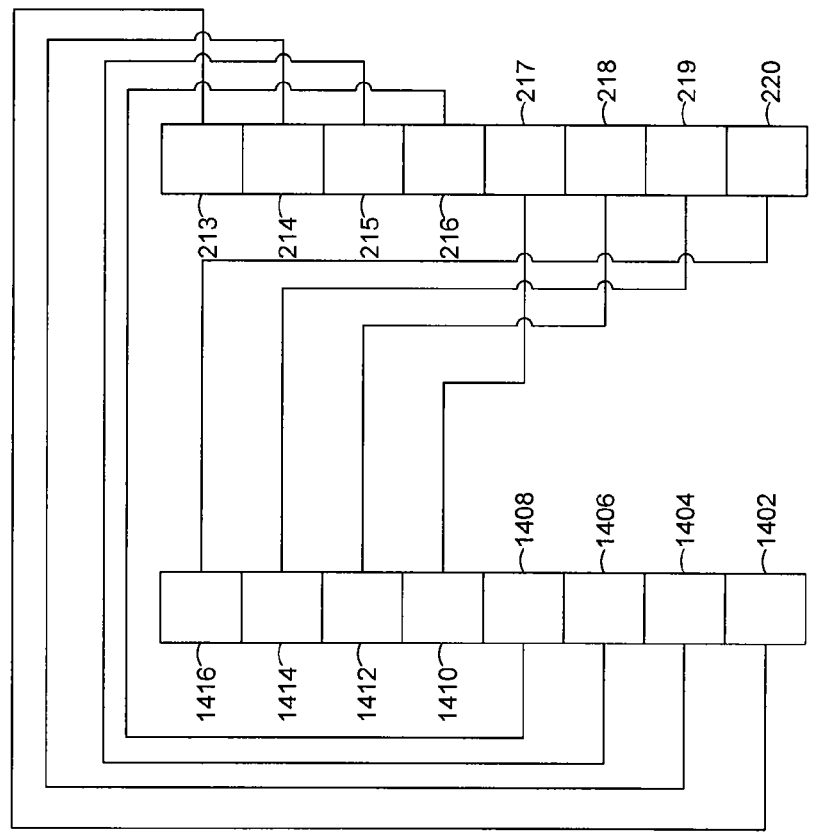
FIG. 14 is a block diagram of an embodiment of first byte bit reversal function 1302.

FIG. 14 is a block diagram of an embodiment of first byte bit reversal function 1302. Second byte bit reversal function 1304, third byte bit reversal function 1306, and fourth byte bit reversal function 1308 can each be configured in a similar manner. In first byte bit reversal function 1302, the value of most significant bit 213 is transferred to a least significant bit 1402; the value of bit 214 is transferred to a bit 1404; the value of bit 215 is transferred to a bit 1406; the value of bit 216 is transferred to a bit 1408; the value of bit 217 is transferred to a bit 1410; the value of bit 218 is transferred to a bit 1412; the value of bit 219 is transferred to a bit 1414; and the value of least significant bit 220 is transferred to a most significant bit 1416.

Figure 15:
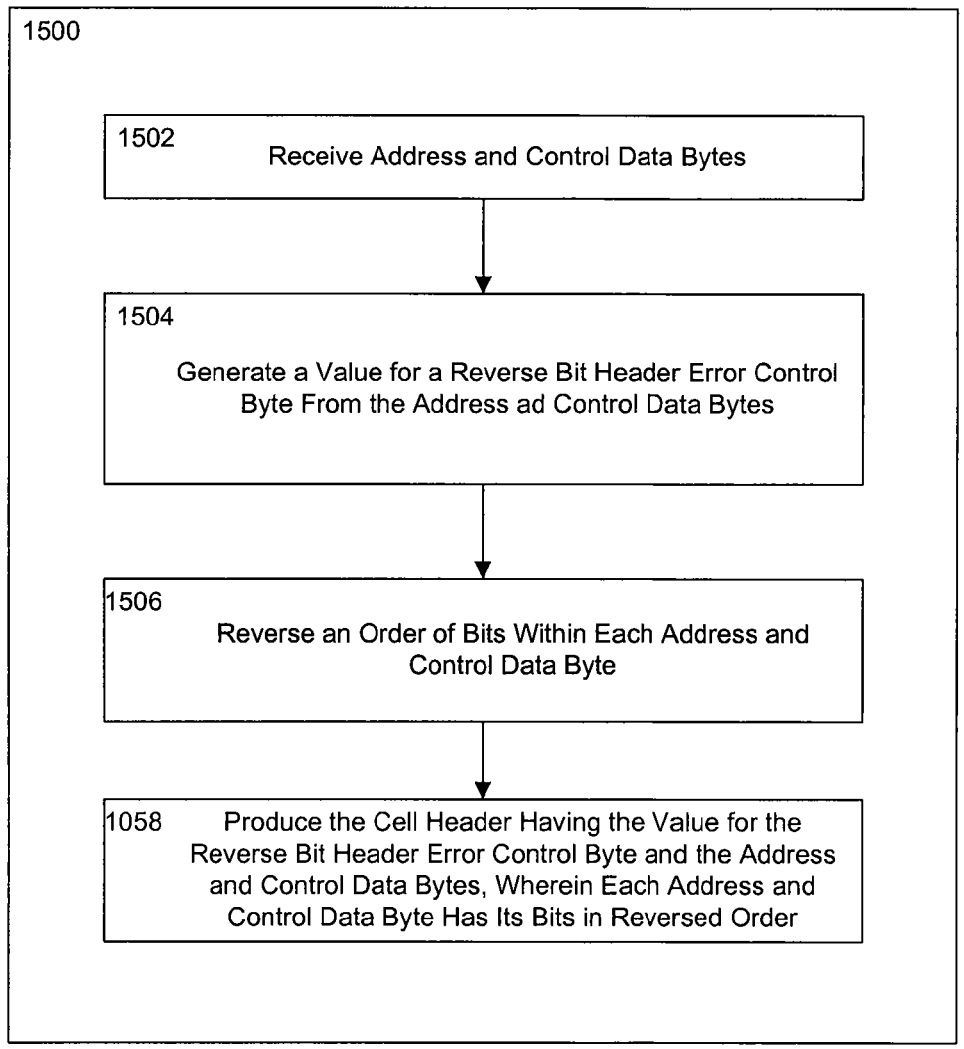
FIG. 15 is a flow diagram of a method 1500 for producing a cell header having bytes with bits in reverse order.

FIG. 15 is a flow diagram of a method 1500 for producing a cell header having bytes with bits in reverse order. In method 1500, at a step 1502, address and control data bytes are received. The address and control data bytes can comprise 32 bits. Each bit can be identified according to its significance within the address and control data bytes such that a most significant bit is identified as a first bit and a least significant bit is identified as a thirty-second bit. At a step 1504, a value for a reverse bit Header Error Control byte is generated from the address and control data bytes.

Figure 16:
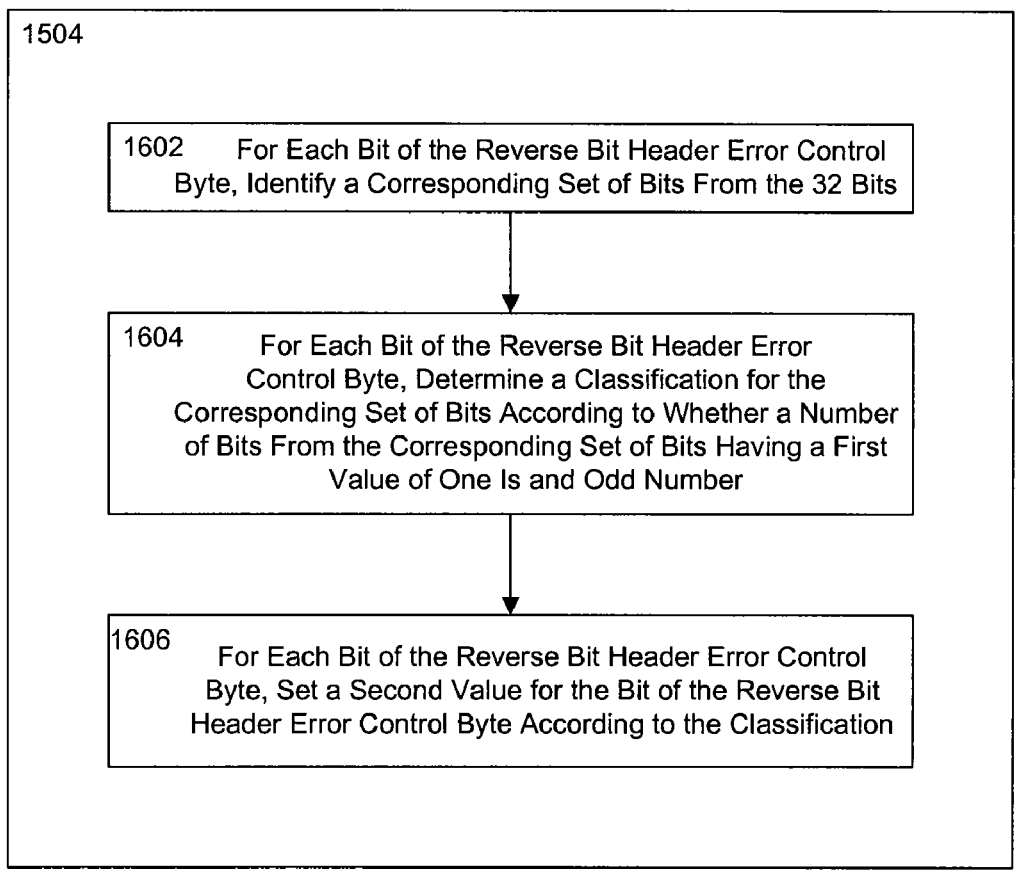
FIG. 16 is a flow diagram of a method 1504 for generating a value for a reverse bit Header Error Control byte.

FIG. 16 is a flow diagram of a method 1504 for generating a value for a reverse bit Header Error Control byte. The reverse bit Header Error Control byte can comprise eight bits. Each bit of the eight bits can be identified according its significance within the reverse bit Header Error Control byte such that a most significant bit is identified as a first Header Error Control bit and a least significant bit is identified as an eighth Header Error Control bit. A value can be generated for each bit of the reverse bit Header Error Control byte. In method 1504, at a step 1602, for each bit of the reverse bit Header Error Control byte, a corresponding set of bits from the 32 bits is identified.

For the first Header Error Control bit, the corresponding set of bits can comprise the first bit, the second bit, the eighth bit, the tenth bit, the twelfth bit, the sixteenth bit, the seventeenth bit, the nineteenth bit, the twenty-first bit, the twenty-second bit, the twenty-fourth bit, the twenty-fifth bit, the twenty-sixth bit, and the twenty-eighth bit.

For the second Header Error Control bit, the corresponding set of bits can comprise the second bit, the seventh bit, the eighth bit, the ninth bit, the tenth bit, the eleventh bit, the twelfth bit, the fifteenth bit, the seventeenth bit, the eighteenth bit, the nineteenth bit, the twentieth bit, the twenty-second bit, the twenty-third bit, the twenty-fourth bit, the twenty-sixth bit, the twenty-seventh bit, the twenty-eighth bit, and the thirty-second bit.

For the third Header Error Control bit, the corresponding set of bits can comprise the second bit, the sixth bit, the seventh bit, the eighth bit, the ninth bit, the eleventh bit, the twelfth bit, the fourteenth bit, the sixteenth bit, the eighteenth bit, the twenty-third bit, the twenty-seventh bit, the twenty-eighth bit, the thirty-first bit, and the thirty-second bit.

For the fourth Header Error Control bit, the corresponding set of bits can comprise the first bit, the fifth bit, the sixth bit, the seventh bit, the tenth bit, the eleventh bit, the thirteenth bit, the fifteenth bit, the seventeenth bit, the twenty-second bit, the twenty-fourth bit, the twenty-sixth bit, the twenty-seventh bit, the thirtieth bit, and the thirty-first bit.

For the fifth Header Error Control bit, the corresponding set of bits can comprise the fourth bit, the fifth bit, the sixth bit, the ninth bit, the tenth bit, the twelfth bit, the fourteenth bit, the sixteenth bit, the twenty-first bit, the twenty-third bit, the twenty-fifth bit, the twenty-sixth bit, the twenty-ninth bit, the thirtieth bit, and the thirty-second bit.

For the sixth Header Error Control bit, the corresponding set of bits can comprise the third bit, the fourth bit, the fifth bit, the ninth bit, the eleventh bit, the thirteenth bit, the fifteenth bit, the twentieth bit, the twenty-second bit, the twenty-fourth bit, the twenty-fifth bit, the twenty-eighth bit, the twenty-ninth bit, and the thirty-first bit.

For the seventh Header Error Control bit, the corresponding set of bits can comprise the second bit, the third bit, the fourth bit, the tenth bit, the twelfth bit, the fourteenth bit, the nineteenth bit, the twenty-first bit, the twenty-third bit, the twenty-fourth bit, the twenty-seventh bit, the twenty-eighth bit, and the thirtieth bit.

For the eighth Header Error Control bit, the corresponding set of bits can comprise the first bit, the second bit, the third bit, the ninth bit, the eleventh bit, the thirteenth bit, the eighteenth bit, the twentieth bit, the twenty-second bit, the twenty-third bit, the twenty-sixth bit, the twenty-seventh bit, and the twenty-ninth bit.

Returning to method 1504, at a step 1604, for each bit of the reverse bit Header Error Control byte, a classification for the corresponding set of bits is determined according to whether a number of bits from the corresponding set of bits having a value of one is an odd number or an even number. At a step 1606, for each bit of the reverse bit Header Error Control byte, a value for the bit is set according to the classification for the corresponding set of bits.

Returning to method 1500, at a step 1506, an order of bits within each address and control data byte is reversed. At a step 1508, the cell header is produced having the value for the reverse bit Header Error Control byte and the address and control data bytes with each address and control data byte having its bits in reversed order.

Figure 17:
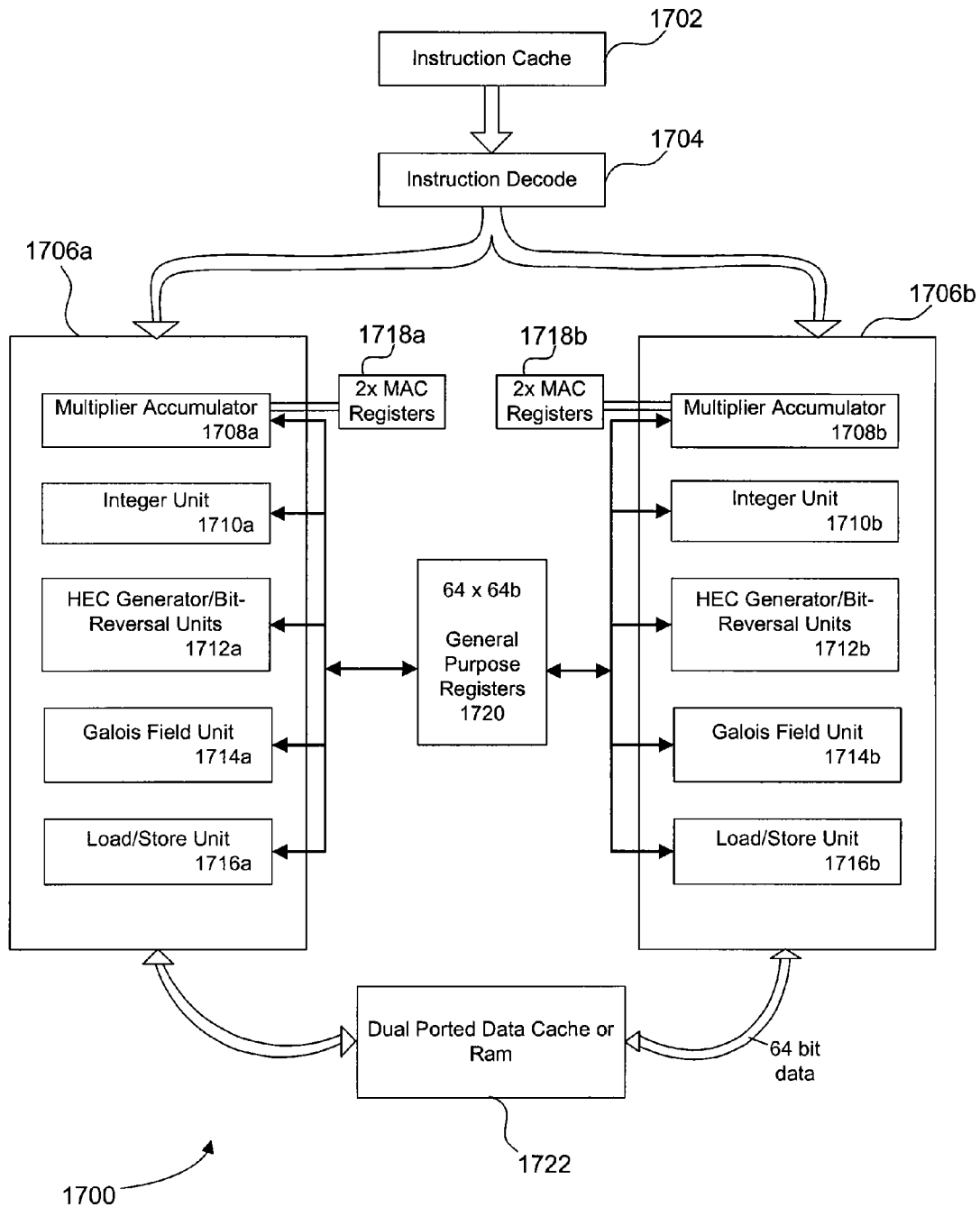
FIG. 17 is a block diagram of a processor in accordance with one embodiment of the present invention.

Referring now to FIG. 17, there is shown a schematic block diagram of the core of a modem processor 1700 in accordance with one embodiment of the present invention. In a preferred embodiment, processor 1700 is the FirePath processor used in the BCM6411 and BCM6510 devices produced by Broadcom Corporation of Irvine, Calif. The processor 1700 is a 64 bit long instruction word (LIW) machine consisting of two execution units 1706a, 1706b. Each unit 1706a, 1706b is capable of 64 bit execution on multiple data units, (for example, four 16 bit data units at once), each controlled by half of the 64 bit instruction. The twin execution units, 1706a, 1706b, may include single instruction, multiple data (SIMD) units.

Processor 1700 also includes an instruction cache 1702 to hold instructions for rapid access, and an instruction decoder 1704 for decoding the instruction received from the instruction cache 1702. Processor 1700 further includes a set of MAC Registers 1718a, 1718b, that are used to improve the efficiency of multiply-and-accumulate (MAC) operations common in digital signal processing, sixty four (or more) general purpose registers 1720 which are preferably 64 bits wide and shared by execution units 1706a, 1706b, and a dual ported data cache or RAM 1722 that holds data needed in the processing performed by the processor. Execution units 1706a, 1706b further comprise multiplier accumulator units 1708a, 1708b, integer units 1710a, 1710b, HEC generator/bit-reversal units 1712a, 1712b, Galois Field units 1714a, 1714b, and load/store units 1716a, 1716b.

Multiplier accumulator units 1708a, 1708b perform the process of multiplication and addition of products (MAC) commonly used in many digital signal processing algorithms such as may be used in a DSL modem.

Integer units 1710a, 1710b, perform many common operations on integer values used in general computation and signal processing.

Galois Field units 1714a, 1714b perform special operations using Galois field arithmetic, such as may be executed in the implementation of the well-known Reed-Solomon error protection coding scheme.

Load/store units 1716a, 1716b perform accesses to the data cache or RAM, either to load data values from it into general purpose registers 1720 or store values to it from general purpose registers 1720. They also provide access to data for transfer to and from peripheral interfaces outside the core of processor 1700, such as an external data interface for ATM cell data.

HEC generator/bit-reversal units 1712a, 1712b directly implement the HEC byte generator and bit-reversal process for the processor 1700. These units may be instantiated separately within the processor 1700 or may be integrated within another unit such as the integer unit 1710. In one embodiment, each HEC generator/bit reverse unit 1712a, 1712b takes as input 4 bytes of address and control input data and produces as output a bit-reversed address and control data and an HEC byte data.

Referring now to FIG. 18A, there is shown an example of an instruction format for a two-operand instruction supported by the processor 1700. In one embodiment, the instruction format includes 20 bits of opcode and control information, and two six-bit operand specifiers. As will be appreciated by one skilled in the art, exact details such as the size of the instruction in bits, and how the various parts of the instruction are laid out and ordered within the instruction format, are not themselves critical to the principles of the present invention: the parts could be in any order as might be convenient for the implementation of the instruction decoder 1704 of the processor 1700 (including the possibility that any part of the instruction such as the opcode and control information may not be in a single continuous sequence of bits such as is shown in FIG. 18). The operand specifiers are references to registers in the set of general purpose registers 1720 of processor 1700. The first of the operands is a reference to a destination register for storing the results of the instruction, and the second operand is a reference to a source register for the instruction.

Referring now to FIG. 18B, there is shown an example of a possible instruction format for generating and bit-reversing an HEC byte and bit-reversing address and control bytes of an ATM cell header (ATMHEC) supported by processor 1700 in accordance to the present invention. Again it should be observed that exact details of how this instruction format is implemented—the size, order and layout of the various parts of the instruction, exact codes used to represent the ATMHEC opcode, etc.—are not critical to the principles of the present invention. The ATMHEC instruction uses the two-operand instruction format shown in FIG. 18A, and in one embodiment, is defined to take two six-bit operand specifiers. The first of the operands is a reference to a destination register for an output "out" where the results of the ATMHEC instruction are stored. The second operand is a reference to a source register for the data input "in" from which the input data is read. One skilled in the art will realize that the present invention is not limited to any specific register or location for those registers but that the instruction of the present invention may refer to an arbitrary register in the general purpose registers 1720.

Thus, by means of this generality of specification, the present invention advantageously achieves great flexibility in the use of the invention. For example, the present invention enables the input data to be obtained from any location chosen by the implementor (e.g. by first loading that data from the memory 1722, or from an external data interface connected via load/store units 1716a, 1716b, into any convenient register). Likewise, the resulting output may be placed anywhere convenient for further processing such as in some general purpose register 1720 for immediate further operations, or the resulting output data may be placed back in memory 1722 for later use. Thus, the flexibility of the present invention is in sharp contrast to conventional (hardware) implementations, where the data flow is fixed in an arrangement dictated by the physical movement of data through the hardware, and cannot be adapted or modified to suit different modes of use.

Including the bit-reversal process as part of the function carried out by the instruction in the present invention is advantageous in that the external data interface circuitry through which the ATM cells are received or transmitted can simply pass all bytes through in the standard bit-order, rather than itself reverse the order. Thus, the external data interface is not specialized to the handling of only ATM cell data and could be used to transfer other types of data (which are unlikely to require the bit-order reversal) without impediment. Moreover, the present invention allows for software to process certain parts of the ATM cells (particularly the cell headers which are distinct from the payload bytes) in the standard bit order (as used outside the DSL modem), e.g. to work with cell addressing information which is stored in each cell header. If the external data interface itself reversed the bit-order for all bytes passing through, this would necessitate extra steps of reversing and/or re-reversing the bit-order for the cell header bytes being specifically processed.

In one embodiment, the HEC byte generating and bit-reversal instruction is used in the software on a processor chip-set implementing a central-office modem end of a DSL link (e.g. ADSL or VDSL). However, one skilled in the art will realize that the present invention is not limited to this implementation, but may be equally used in other contexts where data must be bit-reversed and header-checked in the same way, such as in a DSL CPE modem at the customer premise, or in systems not implementing DSL.

In one embodiment, the ATMHEC instruction takes as input a 4-byte sequence of data bytes as a 32-bit contiguous value and directly computes the HEC byte value assuming the 4 bytes represent an ATM cell header's address and control field with each byte being in that bit-order which is used on the external side of the modem's data interface. At the same time, the 4 input bytes are each reversed in bit-order thus placing them into the correct bit-order for internal use within the modem. Thus, the present invention results in a 5-byte sequence comprising the 4 bit-reversed address and control bytes and the computed HEC byte, itself bit-ordered as required inside the modem. In a preferred embodiment, the present invention is implemented in a machine whose native data size is 64 bits, as illustrated in FIG. 17, and the instruction outputs an 8-byte (64 bit) value where the remaining 3 bytes of the resulting output are all set to zero. The resulting bits are then written to the output operand. Thus, the 5 of the 8 bytes of data each have their bit order reversed, thus satisfying the requirement for bit order change between external and internal versions of the bytes of each ATM cell, without requiring additional hardware in the modem circuits implementing the external data transfer.

In a preferred embodiment, the ATMHEC instruction is defined to take two 64-bit operands—one input and one output. The four bytes of header address/control data are the least significant four bytes (32 bits) of the "in" operand, ordered with least significant byte first. The remaining four bytes of "in" are ignored. Below is a description of a preferred embodiment for implementing the ATMHEC instruction and creating "out" from "in":

```
out.<7...0> =       BITREV(in.<7...0>)
out.<15...8> =      BITREV(in.<15...8>)
out.<23...16> =     BITREV(in.<23...16>)
out.<31...24> =     BITREV(in.<31...24>)
out.32 =            EXOR(0, in.{3, 5, 6, 9, 10, 12, 14, 19, 21, 23, 29, 30, 31})
out.33 =            EXOR(1, in.{2, 4, 5, 8, 9, 11, 13, 18, 20, 22, 28, 29, 30})
out.34 =            EXOR(0, in.{1, 3, 4, 7, 8, 10, 12, 17, 19, 21, 23, 27, 28, 29})
out.35 =            EXOR(1, in.{0, 2, 3, 6, 7, 9, 11, 16, 18, 20, 22, 23, 26, 27, 28})
out.36 =            EXOR(0, in.{1, 2, 5, 6, 8, 10, 15, 17, 19, 21, 22, 25, 26, 27, 31})
out.37 =            EXOR(1, in.{0, 1, 4, 5, 9, 14, 16, 18, 20, 21, 23, 24, 25, 26, 30})
out.38 =            EXOR(0, in.{0, 4, 5, 6, 8, 9, 10, 12, 13, 14, 15, 17, 20, 21, 22, 23, 24, 25, 30})
out.39 =            EXOR(1, in.{4, 6, 7, 8, 10, 11, 13, 15, 16, 20, 22, 24, 30, 31})
out.{40, 41, ... 63} = 0
```

In the above description, the meanings of the terms are defined as described below.

| | |
|---|---|
| val.n | (where val stands for any identifier such as data, state, etc . . . and n stands for an integer, e.g. 45) means bit n of value val, where bit 0 is the least significant and earliest bit and bit 1 is the next more significant (more recent) bit, etc. |
| val.{i, j, k, . . . } | is a shorthand way of writing val.i, val.j, val.k, . . . |
| val.<m . . . n> | means the linear bit sequence (val.m, val.(m−1), . . . val.n) considered as an ordered composite multi-bit entity where val.m is the most significant (and most recent) bit and val.n the least significant (and earliest) bit of the sequence. |
| EXOR(a, b, c, . . . ) | computes the single bit logical result (a ^ b ^ c . . . ) where ^ means logical "exclusive-or" and the terms may be combined in any order. |
| BITREV(bseq) | creates a new linear bit sequence by taking the bits of the linear bit sequence bseq in reverse order. |

In the above equations, the eight output bit values identified as out.32, out.33, . . . out.39 together form the HEC byte 202 generated by the instruction. It should be noted that in the equations defining the creation of these bits, the first term supplied to the EXOR function is a constant, 1 or 0, in an alternating pattern through the sequence of output bits. The composite value of these constant bits, when read in reversed order from out.39 down to out.32, forms the bit pattern '01010101' specified to be combined by exclusive-or into the HEC bits by the relevant standard for the generating of ATM HEC byte in the context of DSL, that is ITU-T Recommendation I.432.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. In an Asynchronous Transfer Mode cell, a method for producing a cell header having bytes with bits in reverse order, comprising:

(1) receiving address and control data bytes;

(2) generating a value for a reverse bit Header Error Control byte from said received address and control data bytes;

(3) only reversing an order of bits within each said received address and control data byte; and (4) producing the cell header having said generated value for the reverse bit Header Error Control byte and said received address and control data bytes, wherein said received address and control data byte in the cell header has said reversed order of bits.

2. The method of claim 1, wherein said received address and control data bytes comprise 32 bits, wherein each bit of the 32 bits is identified according to a first significance of the bit within said received address and control data bytes such that a most significant bit of the 32 bits is identified as a first bit and a least significant bit of the 32 bits is identified as a thirty-second bit, and wherein step (2) comprises:

(a) identifying a corresponding set of bits from the 32 bits for each bit of the reverse bit Header Error Control byte;

(b) determining for each bit of the reverse bit Header Error Control byte a classification for said identified corresponding set of bits according to whether a number of bits from said identified corresponding set of bits having a value of one is one of an odd number and an even number; and (c) setting each bit of the reverse bit Header Error Control byte according to said determined classification.

3. The method of claim 2, wherein the reverse bit Header Error Control byte comprises eight bits, wherein each bit of the eight bits is identified according to a second significance of the bit within the reverse bit Header Error Control byte such that a most significant bit of the eight bits is identified as a first Header Error Control bit and a least significant bit of the eight bits is identified as an eighth Header Error Control bit.

4. The method of claim 3, wherein for the first Header Error Control bit said determined corresponding set of bits comprises the first bit, the second bit, the eighth bit, the tenth bit, the twelfth bit, the sixteenth bit, the seventeenth bit, the nineteenth bit, the twenty-first bit, the twenty-second bit, the twenty-fourth bit, the twenty-fifth bit, the twenty-sixth bit, and the twenty-eighth bit.

5. The method of claim 3, wherein for the second Header Error Control bit said determined corresponding set of bits comprises the second bit, the seventh bit, the eighth bit, the ninth bit, the tenth bit, the eleventh bit, the twelfth bit, the fifteenth bit, the seventeenth bit, the eighteenth bit, the nineteenth bit, the twentieth bit, the twenty-second bit, the twenty-third bit, the twenty-fourth bit, the twenty-sixth bit, the twenty-seventh bit, the twenty-eighth bit, and the thirty-second bit.

6. The method of claim 3, wherein for the third Header Error Control bit said determined corresponding set of bits comprises the second bit, the sixth bit, the seventh bit, the eighth bit, the ninth bit, the eleventh bit, the twelfth bit, the fourteenth bit, the sixteenth bit, the eighteenth bit, the twenty-third bit, the twenty-seventh bit, the twenty-eighth bit, the thirty-first bit, and the thirty-second bit.

7. The method of claim 3, wherein for the fourth Header Error Control bit said determined corresponding set of bits comprises the first bit, the fifth bit, the sixth bit, the seventh bit, the tenth bit, the eleventh bit, the thirteenth bit, the fifteenth bit, the seventeenth bit, the twenty-second bit, the twenty-fourth bit, the twenty-sixth bit, the twenty-seventh bit, the thirtieth bit, and the thirty-first bit.

8. The method of claim 3, wherein for the fifth Header Error Control bit said determined corresponding set of bits comprises the fourth bit, the fifth bit, the sixth bit, the ninth bit, the tenth bit, the twelfth bit, the fourteenth bit, the sixteenth bit, the twenty-first bit, the twenty-third bit, the twenty-fifth bit, the twenty-sixth bit, the twenty-ninth bit, the thirtieth bit, and the thirty-second bit.

9. The method of claim 3, wherein for the sixth Header Error Control bit said determined corresponding set of bits comprises the third bit, the fourth bit, the fifth bit, the ninth bit, the eleventh bit, the thirteenth bit, the fifteenth bit, the twentieth bit, the twenty-second bit, the twenty-fourth bit, the twenty-fifth bit, the twenty-eighth bit, the twenty-ninth bit, and the thirty-first bit.

10. The method of claim 3, wherein for the seventh Header Error Control bit said determined corresponding set of bits comprises the second bit, the third bit, the fourth bit, the tenth bit, the twelfth bit, the fourteenth bit, the nineteenth bit, the twenty-first bit, the twenty-third bit, the twenty-fourth bit, the twenty-seventh bit, the twenty-eighth bit, and the thirtieth bit.

11. The method of claim 3, wherein for the eighth Header Error Control bit said determined corresponding set of bits comprises the first bit, the second bit, the third bit, the ninth bit, the eleventh bit, the thirteenth bit, the eighteenth bit, the twentieth bit, the twenty-second bit, the twenty-third bit, the twenty-sixth bit, the twenty-seventh bit, and the twenty-ninth bit.

12. An apparatus for producing an ATM cell header having bytes with bits in reverse order, the apparatus comprising:
    an input for receiving address and control data bytes;
    a reverse bit Header Error Control value generator for generating a value for a reverse bit Header Error Control byte from said received address and control data bytes;
    a bit-reversal function for only reversing an order of bits within each said received address and control data byte; and
    an output for producing the cell header having said generated value for the reverse bit Header Error Control byte and said received address and control data bytes, wherein each said received address and control data byte has said reversed order of bits.

13. The apparatus of claim 12, wherein said received address and control data bytes comprise 32 bits, wherein each bit of the 32 bits is identified according to a first significance of the bit within said received address and control data bytes such that a most significant bit of the 32 bits is identified as a first bit and a least significant bit of the 32 bits is identified as a thirty-second bit, and wherein said reverse bit Header Error Control value generator (a) identifies a corresponding set of bits from the 32 bits for each bit of the reverse bit Header Error Control byte;

(b) determines for each bit of the reverse bit Header Error Control byte a classification for said identified corresponding set of bits according to whether a number of bits from said identified corresponding set of bits having a value of one is one of an odd number and an even number; and (c) sets a value for each bit of the reverse bit Header Error Control byte according to said determined classification.

14. The apparatus of claim 13, wherein the reverse bit Header Error Control byte comprises eight bits, wherein each bit of the eight bits is identified according to a second significance of the bit within the reverse bit Header Error Control byte such that a most significant bit of the eight bits is identified as a first Header Error Control bit and a least significant bit of the eight bits is identified as an eighth Header Error Control bit.

15. The apparatus of claim 14, wherein for the first Header Error Control bit said determined corresponding set of bits comprises the first bit, the second bit, the eighth bit, the tenth bit, the twelfth bit, the sixteenth bit, the seventeenth bit, the nineteenth bit, the twenty-first bit, the twenty-second bit, the twenty-fourth bit, the twenty-fifth bit, the twenty-sixth bit, and the twenty-eighth bit.

16. The apparatus of claim 14, wherein for the second Header Error Control bit said determined corresponding set of bits comprises the second bit, the seventh bit, the eighth bit, the ninth bit, the tenth bit, the eleventh bit, the twelfth bit, the fifteenth bit, the seventeenth bit, the eighteenth bit, the nineteenth bit, the twentieth bit, the twenty-second bit, the twenty-third bit, the twenty-fourth bit, the twenty-sixth bit, the twenty-seventh bit, the twenty-eighth bit, and the thirty-second bit.

17. The apparatus of claim 14, wherein for the third Header Error Control bit said determined corresponding set of bits comprises the second bit, the sixth bit, the seventh bit, the eighth bit, the ninth bit, the eleventh bit, the twelfth bit, the fourteenth bit, the sixteenth bit, the eighteenth bit, the twenty-third bit, the twenty-seventh bit, the twenty-eighth bit, the thirty-first bit, and the thirty-second bit.

18. The apparatus of claim 14, wherein for the fourth Header Error Control bit said determined corresponding set of bits comprises the first bit, the fifth bit, the sixth bit, the seventh bit, the tenth bit, the eleventh bit, the thirteenth bit, the fifteenth bit, the seventeenth bit, the twenty-second bit, the twenty-fourth bit, the twenty-sixth bit, the twenty-seventh bit, the thirtieth bit, and the thirty-first bit.

19. The apparatus of claim 14, wherein for the fifth Header Error Control bit said determined corresponding set of bits comprises the fourth bit, the fifth bit, the sixth bit, the ninth bit, the tenth bit, the twelfth bit, the fourteenth bit, the sixteenth bit, the twenty-first bit, the twenty-third bit, the twenty-fifth bit, the twenty-sixth bit, the twenty-ninth bit, the thirtieth bit, and the thirty-second bit.

20. The apparatus of claim 14, wherein for the sixth Header Error Control bit said determined corresponding set of bits comprises the third bit, the fourth bit, the fifth bit, the ninth bit, the eleventh bit, the thirteenth bit, the fifteenth bit, the twentieth bit, the twenty-second bit, the twenty-fourth bit, the twenty-fifth bit, the twenty-eighth bit, the twenty-ninth bit, and the thirty-first bit.

21. The apparatus of claim 14, wherein for the seventh Header Error Control bit said determined corresponding set of bits comprises the second bit, the third bit, the fourth bit, the tenth bit, the twelfth bit, the fourteenth bit, the nineteenth bit, the twenty-first bit, the twenty-third bit, the twenty-fourth bit, the twenty-seventh bit, the twenty-eighth bit, and the thirtieth bit.

22. The apparatus of claim 14, wherein for the eighth Header Error Control bit said determined corresponding set of bits comprises the first bit, the second bit, the third bit, the ninth bit, the eleventh bit, the thirteenth bit, the eighteenth bit, the twentieth bit, the twenty-second bit, the twenty-third bit, the twenty-sixth bit, the twenty-seventh bit, and the twenty-ninth bit.

23. A method for executing a single instruction cell header generator on a processor, the method comprising:
providing the processor with an opcode indicating a cell header generator instruction;
providing the processor with address and control data bytes;
providing the processor with a reference to a destination register of the processor;
generating a cell header output value including generating a value for a reverse bit Header Error Control byte from said received address and control data bytes, and only reversing an order of bits within each said received address and control data byte; and
storing the cell header output value in the destination register.

24. The method of claim 23, wherein said cell header output value comprises bytes with bits in reverse order.

25. The method of claim 23, wherein said cell header output value comprises bit-reversed address and control data bytes and a bit-reversed HEC byte.

26. The method of claim 23, wherein the method is used in a central-office modem end or a customer premise equipment end of a DSL link.

27. A method of operating a processor comprising:
in response to a single instruction executable by the processor, processing a cell header for an ATM cell, wherein the single instruction causes the processor to generate a value for a reverse bit Header Error Control byte from received address and control data bytes, and to only reverse an order of bits within each said received address and control data byte.

28. The method of claim 27, wherein the instruction receives said address and control data bytes from an ATM cell header and produces said reversed Header Error Control byte.

29. The method of claim 28, wherein said reversed Header Error Control byte has bits in reverse order.

30. The method of claim 27, wherein said instruction receives said address and control data bytes from an ATM cell header and checks said reversed Header Error Control byte for said ATM cell header.

31. The method of claim 27, wherein said processor is a 64-bit long instruction word machine comprising two execution units.

32. The method of claim 27, wherein said processor is used in a chip or chip-set implementing a central-office modem end of a DSL link.

33. The method of claim 27, wherein said processor is used in a chip or chip-set implementing a customer premise equipment end of a DSL link.

34. A processor comprising:
a plurality of registers; and
at least one execution unit configured to process a cell header in response to a single instruction executable by the processor, wherein the single instruction causes the at least one execution unit to generate a value for a reverse bit Header Error Control byte from received address and control data bytes, and to only reverse an order of bits within each said received address and control data byte.

35. The processor of claim 34, wherein the single instruction produces a cell header comprising address and control bytes and an HEC byte.

36. The processor of claim 34, wherein the instruction receives as input four bytes of address and control data for an ATM cell and produces as output a five byte ATM cell header.

37. The processor of claim 36, wherein the five byte ATM cell header comprises four bytes of bit-reversed address and control data and a bit-reversed HEC byte.

38. The processor of claim 34, wherein the processor is a 64-Bit long instruction word machine comprising two execution units.

39. The processor of claim 34, wherein the processor is used in a chip or chip-set implementing a central-office modem end of a DSL link.

40. The processor of claim 34, wherein the processor is used in a chip or chip-set implementing a customer premise equipment end of a DSL link.

41. The processor of claim 34, wherein the instruction is used to check validity of the Header Error Control byte of the cell header.

42. An apparatus comprising:
a processor;
a plurality of registers accessible to the processor; and
means for processing a cell header in response to a single instruction executable by the processor, wherein the single instruction causes the means for processing the cell header to generate a value for a reverse bit Header Error Control byte from received address and control data bytes, and to only reverse an order of bits within each said received address and control data byte.

43. The apparatus of claim 42, wherein the instruction produces a cell header comprising address and control bytes and an HEC byte.

44. The apparatus of claim 42, wherein the instruction receives as input four bytes of address and control data for an ATM cell and produces as output a five byte ATM cell header.

45. The apparatus of claim 44, wherein the five byte ATM cell header comprises four bytes of bit-reversed address and control data and a bit-reversed HEC byte.

46. The apparatus of claim 42, wherein the processor is a 64-bit long instruction word machine comprising two execution units.

47. The apparatus of claim 42, wherein the processor is used in a chip or chip-set implementing a central-office modem end of a DSL link.

48. The apparatus of claim 42, wherein the processor is used in a chip or chip-set implementing a customer premise equipment end of a DSL link.

49. The apparatus of claim 42, wherein the instruction is used to check validity of the Header Error Control byte of the cell header.

* * * * *